United States Patent
Miyazaki et al.

(10) Patent No.: US 9,513,765 B2
(45) Date of Patent: Dec. 6, 2016

(54) THREE-DIMENSIONAL SLIDING OBJECT ARRANGEMENT METHOD AND SYSTEM

(75) Inventors: Reiko Miyazaki, Tokyo (JP); Ken Miyashita, Tokyo (JP)

(73) Assignee: Sony Corporation, Tokyo (JP)

( * ) Notice: Subject to any disclaimer, the term of this patent is extended or adjusted under 35 U.S.C. 154(b) by 1179 days.

(21) Appl. No.: 12/257,663

(22) Filed: Oct. 24, 2008

(65) Prior Publication Data

US 2009/0150775 A1    Jun. 11, 2009

(30) Foreign Application Priority Data

Dec. 7, 2007   (JP) ................. 2007-317720
Jul. 4, 2008   (JP) ................. 2008-175839

(51) Int. Cl.
  *G06F 3/0485*   (2013.01)
  *G06F 3/0488*   (2013.01)
  (Continued)

(52) U.S. Cl.
  CPC ........... *G06F 3/04815* (2013.01); *G06F 3/041* (2013.01); *G06F 3/0483* (2013.01); *G06F 3/0485* (2013.01);
  (Continued)

(58) Field of Classification Search
  CPC ...... G06F 3/016; G06F 3/04815; G06F 3/038; G06F 2203/014; G06F 3/03547; G06F 3/04812; G06F 1/1684; G06F 3/045; G06F 3/01; G06F 3/041; G06F 3/0485; G06F 3/0483; G06F 3/04883; G06F 2203/04808
  (Continued)

(56) References Cited

U.S. PATENT DOCUMENTS 5,555,354 A * 9/1996 Strasnick ............... G06T 17/05
                                                                345/427
5,838,326 A * 11/1998 Card et al. .................... 715/775
(Continued)

FOREIGN PATENT DOCUMENTS

EP        0 555 034 A2    8/1993
EP        0 955 591 A2    11/1999
(Continued)

OTHER PUBLICATIONS

Garrod, David. Glossary of Judicial Claim Constructions in the Electronics, Computer and Business Method Arts. © 2010. "circuitry" p. 57).*

(Continued)

*Primary Examiner* — Amy M Levy
(74) *Attorney, Agent, or Firm* — Oblon, McClelland, Maier & Neustadt, L.L.P.

(57) ABSTRACT

An information display terminal includes a first operation information acquiring unit that acquires first operation information including first location information on a display screen via a touch panel including a contact detection surface and the display screen. A three-dimensional coordinate space is projected onto the display screen. An object is arranged within the three-dimensional coordinate space on the basis of three-dimensional coordinate information of the object. The information display terminal also includes a second operation information acquiring unit that acquires second operation information including second location information on the display screen via a contact detection surface provided on a surface on a side opposite to the display screen. In addition, the information display terminal includes a display controlling unit that controls a display of the object in the three-dimensional coordinate space on the (Continued)

display screen on the basis of the acquired first operation information and second operation information.

27 Claims, 23 Drawing Sheets

(51) Int. Cl.
*G06F 3/0481* (2013.01)
*G06F 3/041* (2006.01)
*G06F 3/0483* (2013.01)

(52) U.S. Cl.
CPC . *G06F 3/04883* (2013.01); *G06F 2203/04808* (2013.01)

(58) Field of Classification Search
USPC ....... 715/723, 712, 716, 719, 782, 848, 852; 345/173
See application file for complete search history.

(56) References Cited

U.S. PATENT DOCUMENTS

| | | | | |
|---|---|---|---|---|
| 5,999,185 | A * | 12/1999 | Kato | G06F 3/011 345/420 |
| 6,121,966 | A * | 9/2000 | Teodosio | G06F 3/0481 715/799 |
| 6,137,902 | A * | 10/2000 | Kinoshita et al. | 382/154 |
| 6,166,738 | A * | 12/2000 | Robertson et al. | 715/839 |
| 6,597,347 | B1 | 7/2003 | Yasutake | |
| 6,597,384 | B1 | 7/2003 | Harrison | |
| RE38,286 | E * | 10/2003 | Flowers | 178/18.01 |
| 7,456,823 | B2 * | 11/2008 | Poupyrev et al. | 345/173 |
| 7,536,650 | B1 * | 5/2009 | Robertson et al. | 715/767 |
| 2002/0067379 | A1 * | 6/2002 | Kenyon | G06T 17/05 715/838 |
| 2002/0152127 | A1 * | 10/2002 | Hamilton, II | G06Q 30/0643 705/27.2 |
| 2003/0043174 | A1 | 3/2003 | Hinckley et al. | |
| 2003/0043200 | A1 * | 3/2003 | Faieta | G06F 17/30905 715/804 |
| 2003/0189602 | A1 * | 10/2003 | Dalton et al. | 345/830 |
| 2003/0234768 | A1 | 12/2003 | Rekimoto et al. | |
| 2004/0021663 | A1 | 2/2004 | Suzuki et al. | |
| 2004/0100479 | A1 | 5/2004 | Nakano et al. | |
| 2004/0174398 | A1 * | 9/2004 | Luke | G06F 3/0481 715/856 |
| 2005/0069196 | A1 * | 3/2005 | Uchiyama et al. | 382/154 |
| 2005/0076361 | A1 * | 4/2005 | Choi | H04N 5/44543 725/45 |
| 2005/0138570 | A1 * | 6/2005 | Good et al. | 715/789 |
| 2005/0210410 | A1 * | 9/2005 | Ohwa et al. | 715/821 |
| 2006/0020898 | A1 * | 1/2006 | Kim et al. | 715/764 |
| 2006/0026535 | A1 * | 2/2006 | Hotelling et al. | 715/863 |
| 2006/0111093 | A1 | 5/2006 | Shim et al. | |
| 2006/0123183 | A1 * | 6/2006 | Koivisto | G06F 3/0485 711/1 |
| 2006/0139340 | A1 * | 6/2006 | Geaghan | 345/177 |
| 2006/0161868 | A1 * | 7/2006 | Van Dok | G06F 3/0481 715/835 |
| 2006/0197750 | A1 | 9/2006 | Kerr et al. | |
| 2006/0235985 | A1 * | 10/2006 | Ramkumar | H04L 63/102 709/229 |
| 2006/0238517 | A1 * | 10/2006 | King et al. | 345/173 |
| 2006/0250392 | A1 * | 11/2006 | Vesely et al. | 345/419 |
| 2007/0080953 | A1 | 4/2007 | Lii | |
| 2007/0103454 | A1 * | 5/2007 | Elias | 345/173 |
| 2007/0268261 | A1 * | 11/2007 | Lipson | 345/169 |
| 2008/0168403 | A1 * | 7/2008 | Westerman et al. | 715/863 |
| 2008/0178085 | A1 | 7/2008 | Miyazaki et al. | |
| 2008/0180406 | A1 * | 7/2008 | Han et al. | 345/173 |
| 2008/0307351 | A1 * | 12/2008 | Louch et al. | 715/782 |
| 2009/0080698 | A1 * | 3/2009 | Mihara et al. | 382/103 |
| 2009/0282359 | A1 * | 11/2009 | Saul | G06F 3/0481 715/784 |
| 2009/0307623 | A1 * | 12/2009 | Agarawala et al. | 715/765 |
| 2009/0315834 | A1 * | 12/2009 | Nurmi et al. | 345/173 |
| 2010/0045705 | A1 * | 2/2010 | Vertegaal et al. | 345/661 |
| 2010/0095240 | A1 * | 4/2010 | Shiplacoff | G06F 3/0483 715/784 |

FOREIGN PATENT DOCUMENTS

| | | |
|---|---|---|
| EP | 0 955 591 A3 | 11/1999 |
| EP | 0 977 132 A2 | 2/2000 |
| EP | 1 536 316 A1 | 6/2005 |
| JP | 63-30928 | 2/1988 |
| JP | 2000-105772 | 4/2000 |
| JP | 2000-200147 | 7/2000 |
| JP | 2001-290585 | 10/2001 |
| JP | 2001-331245 | 11/2001 |
| JP | 2001-356878 | 12/2001 |
| JP | 2002-73237 | 3/2002 |
| JP | 2003-150308 | 5/2003 |
| JP | 2003-233446 | 8/2003 |
| JP | 2003-330611 | 11/2003 |
| JP | 2004-70920 | 3/2004 |
| JP | 2004-113386 | 4/2004 |
| JP | 2004-295159 | 10/2004 |
| JP | 2007-272468 | 10/2007 |
| JP | 2007-272904 | 10/2007 |
| JP | 2007-299330 | 11/2007 |
| WO | WO 01/78054 A1 | 10/2001 |
| WO | WO 2004/006080 A2 | 1/2004 |
| WO | WO 2004/006080 A3 | 1/2004 |
| WO | WO 2007/121557 A1 | 11/2007 |

OTHER PUBLICATIONS

Richard Mander, et al. "A 'Pile' Metaphor for Supporting Casual Organization of Information", Striking a Balance, XP000426843, May 3, 1992, pp. 627-634.
Search Report issued Sep. 7, 2010, in European Patent Application No. 08170782.0-1527/2068237.

* cited by examiner

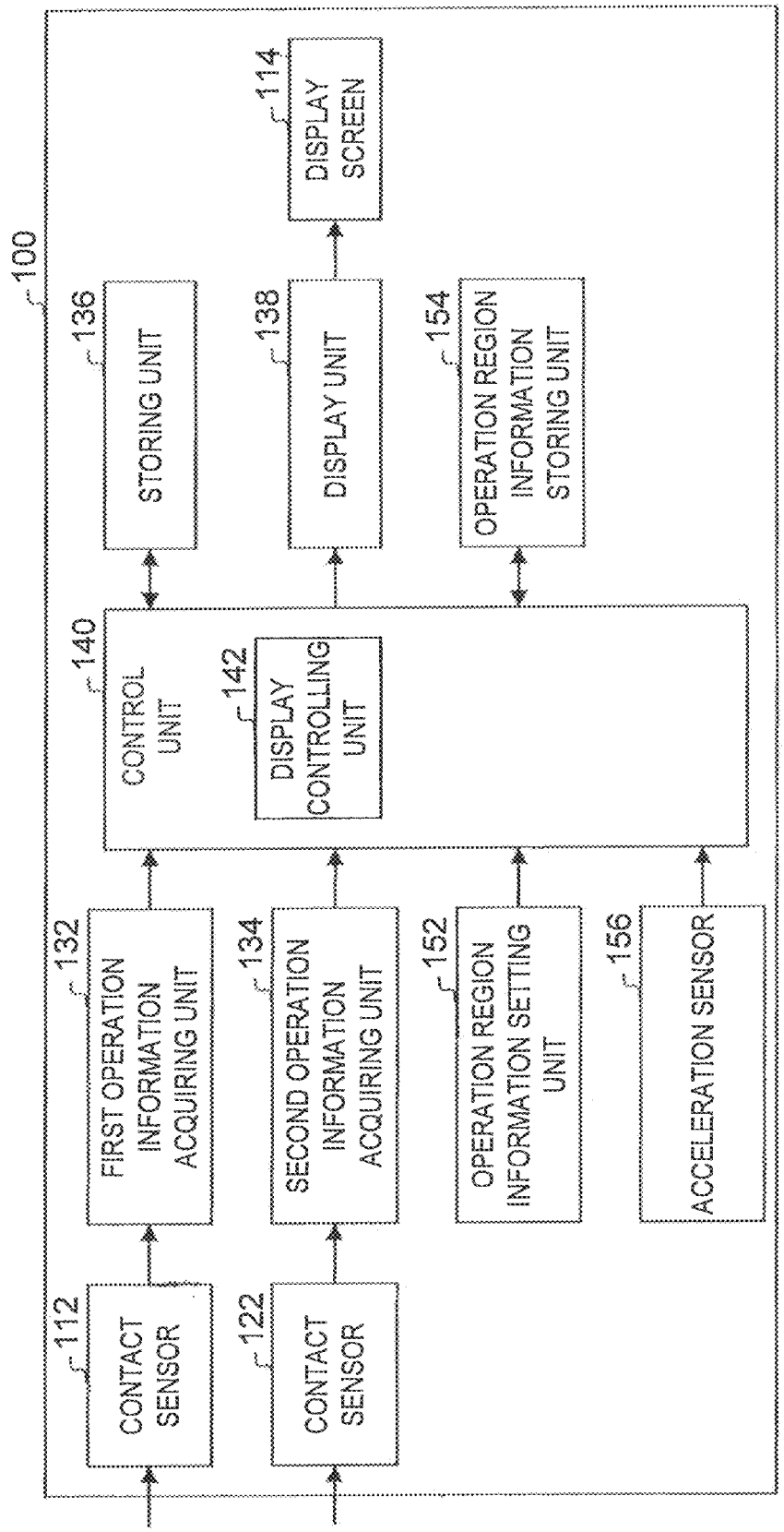

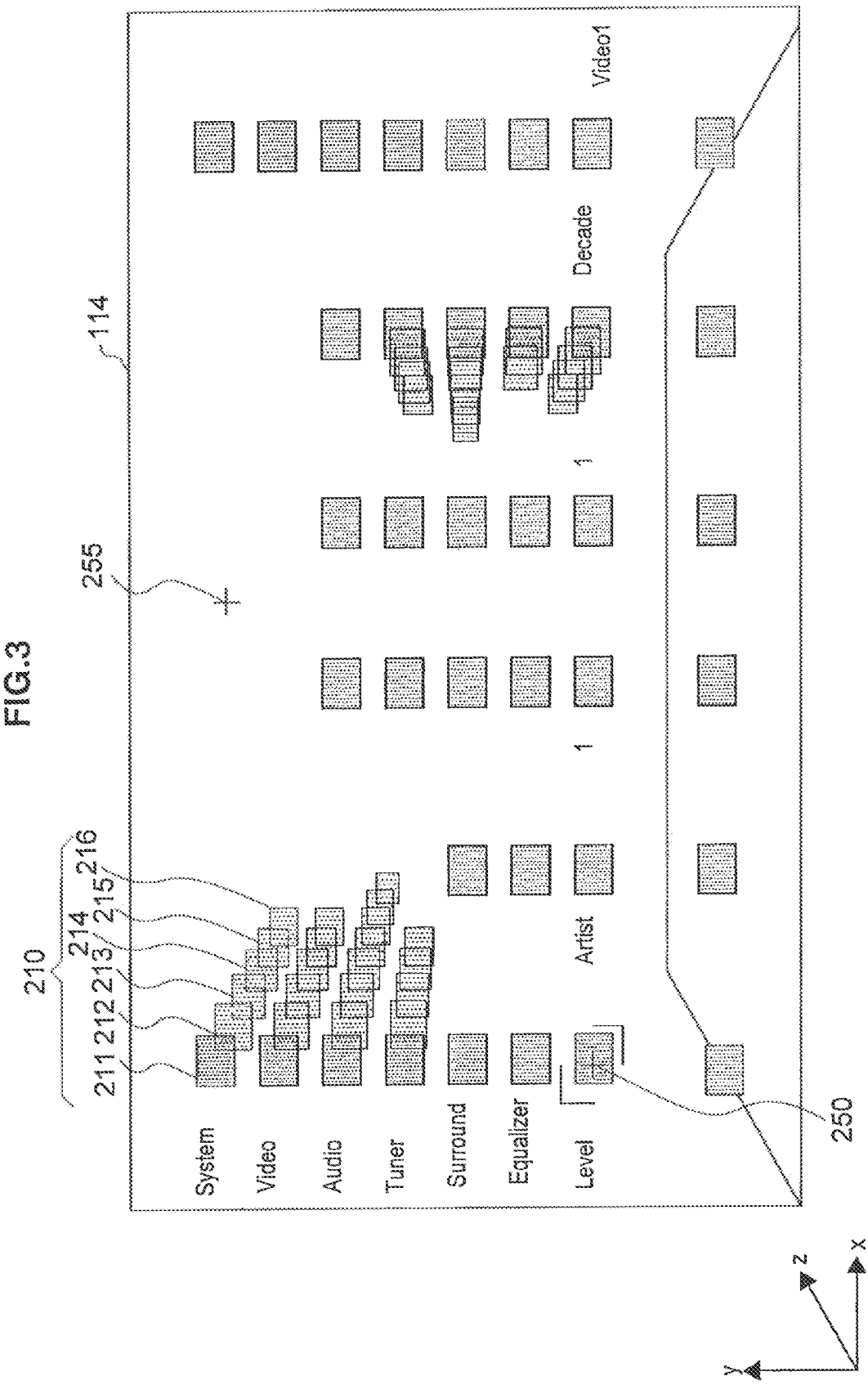

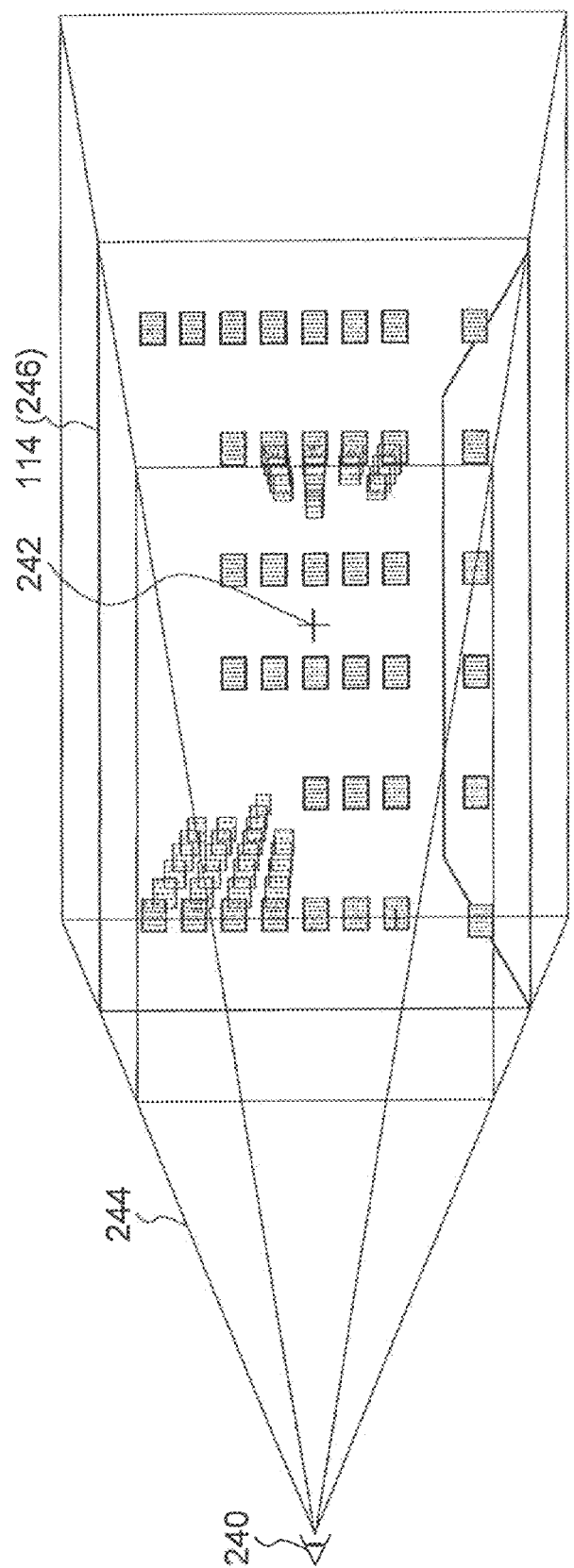

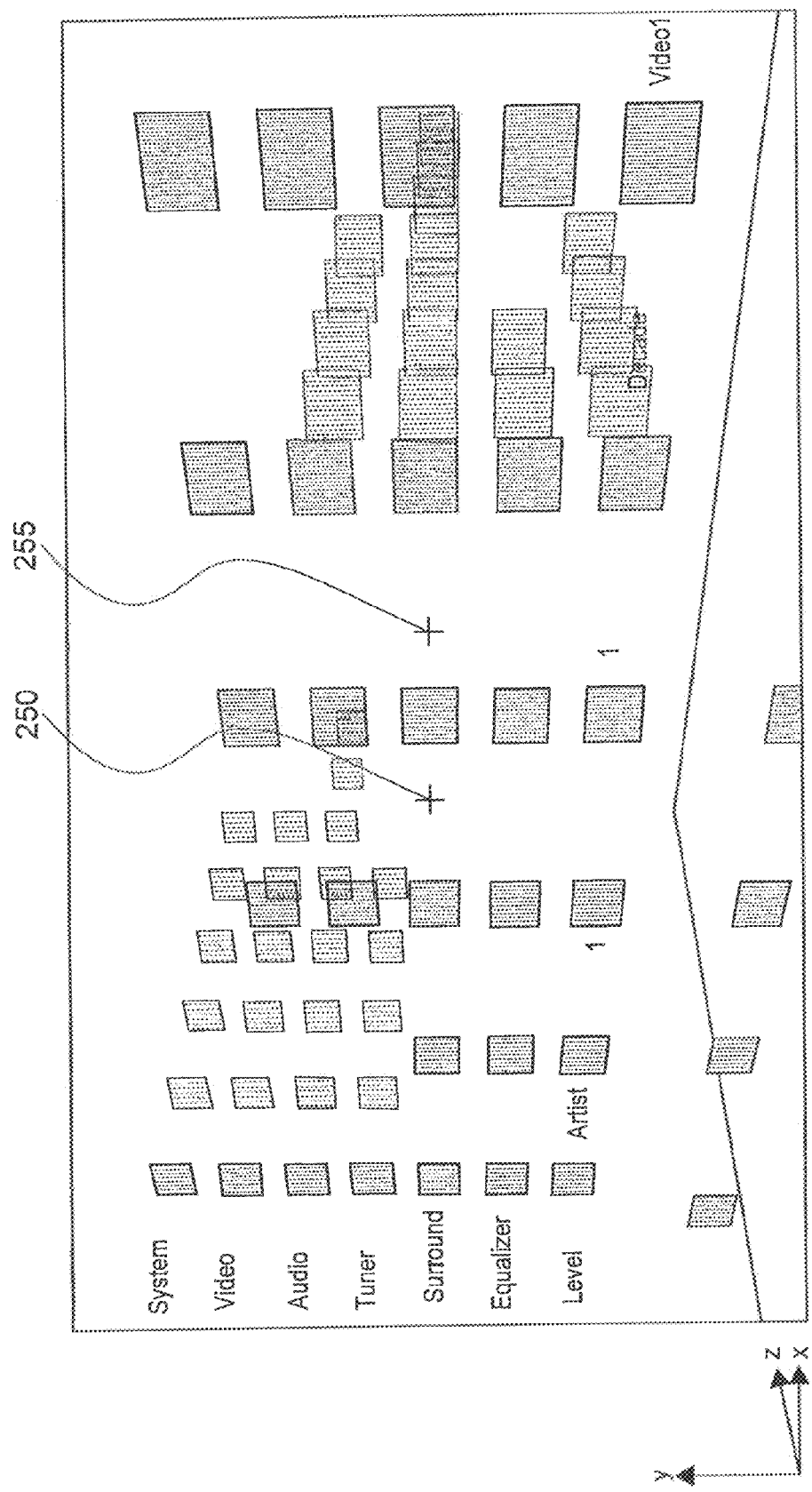

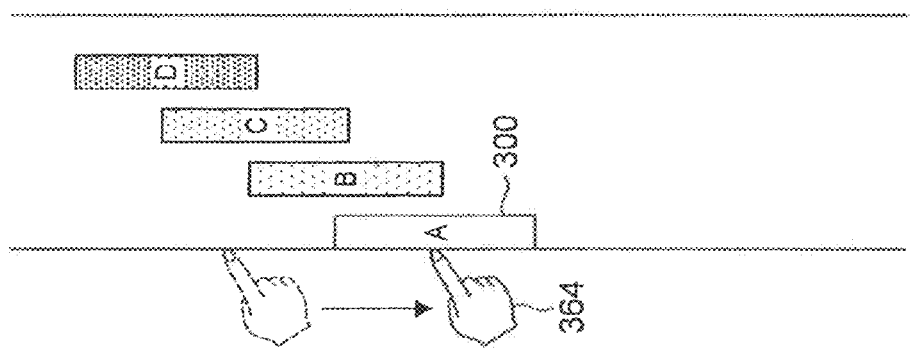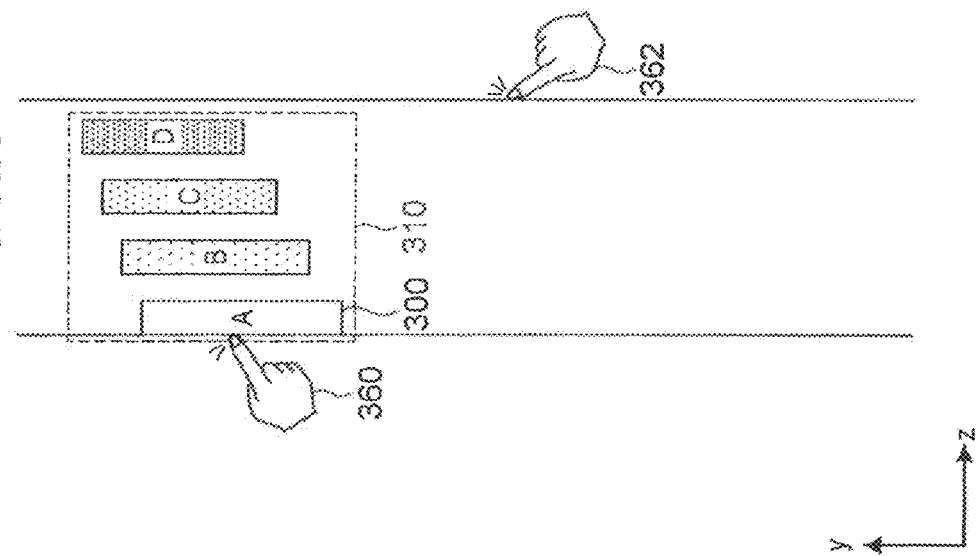

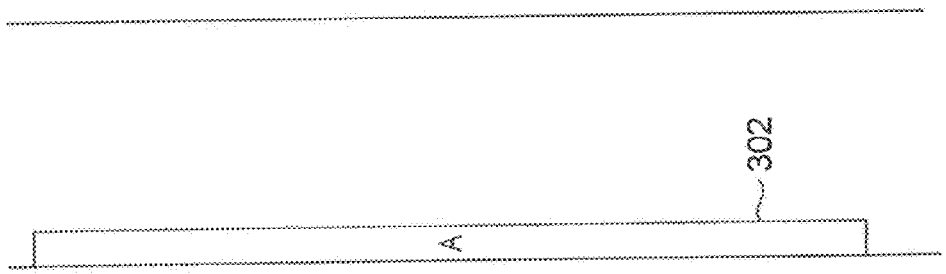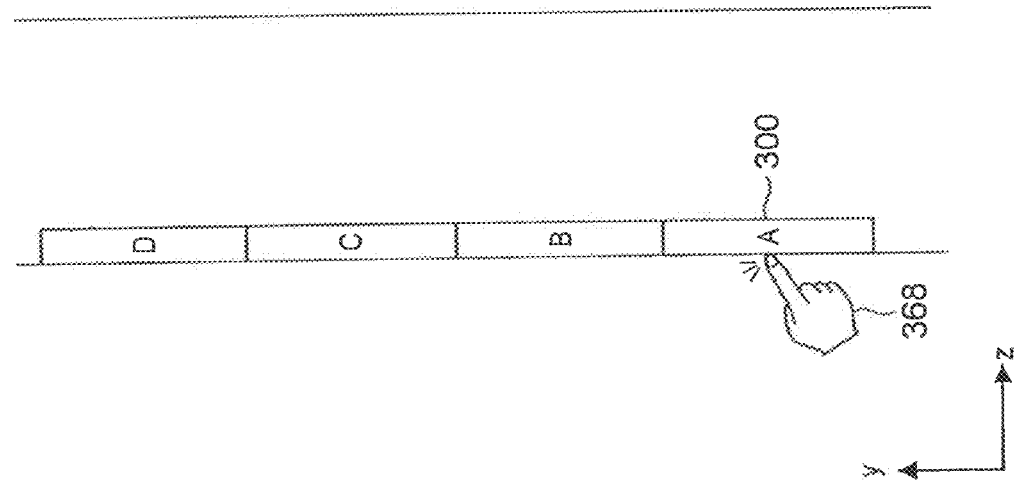

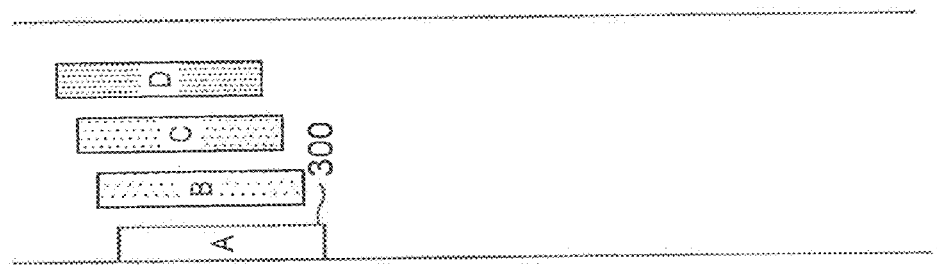
FIG.13B
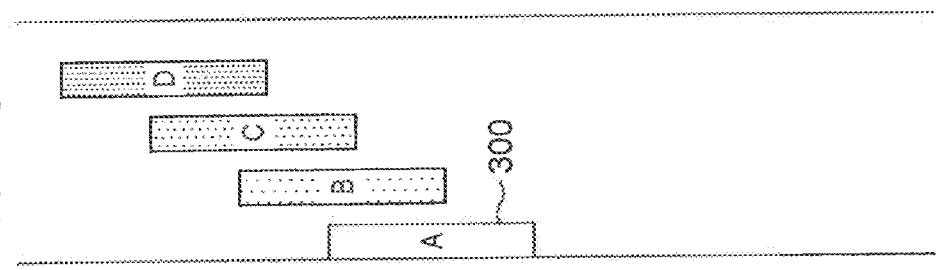
FIG.13A
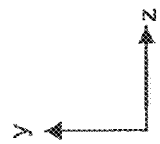

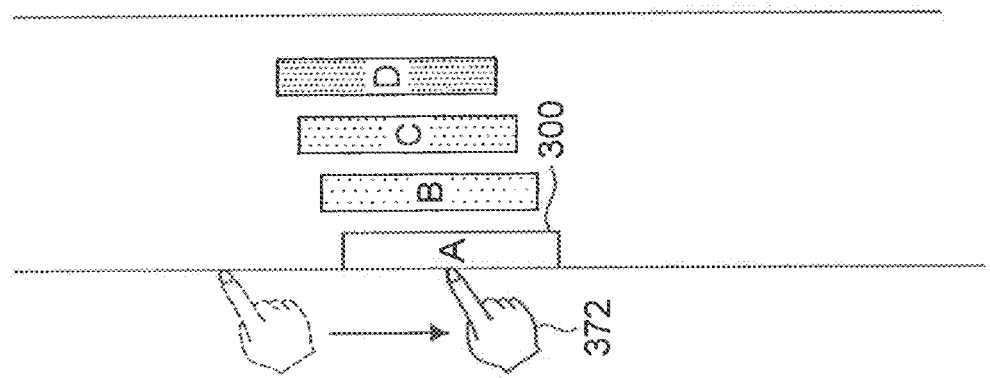
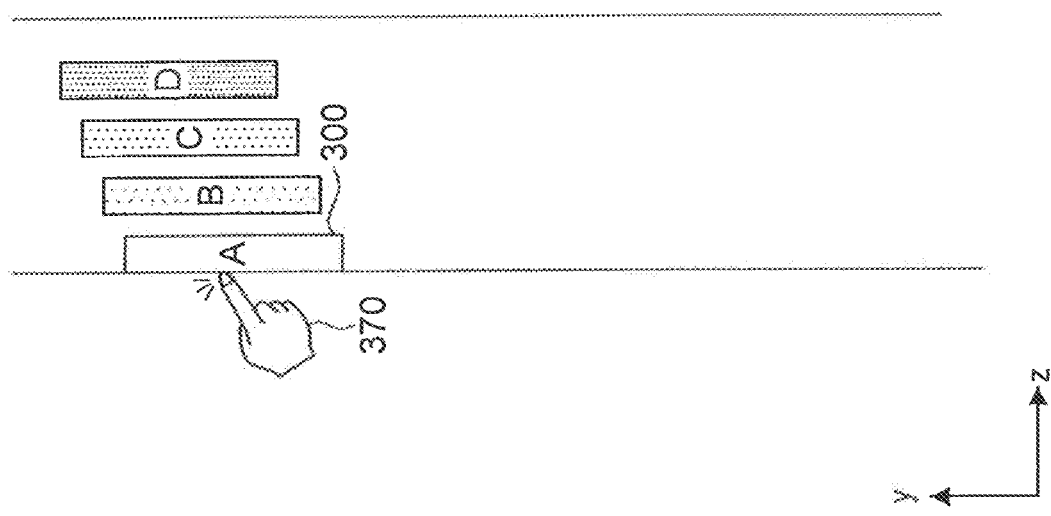

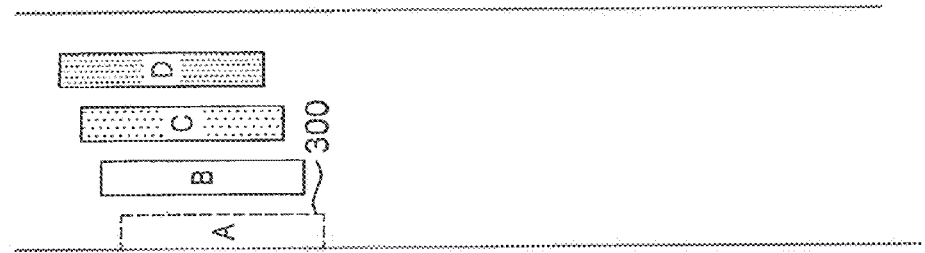
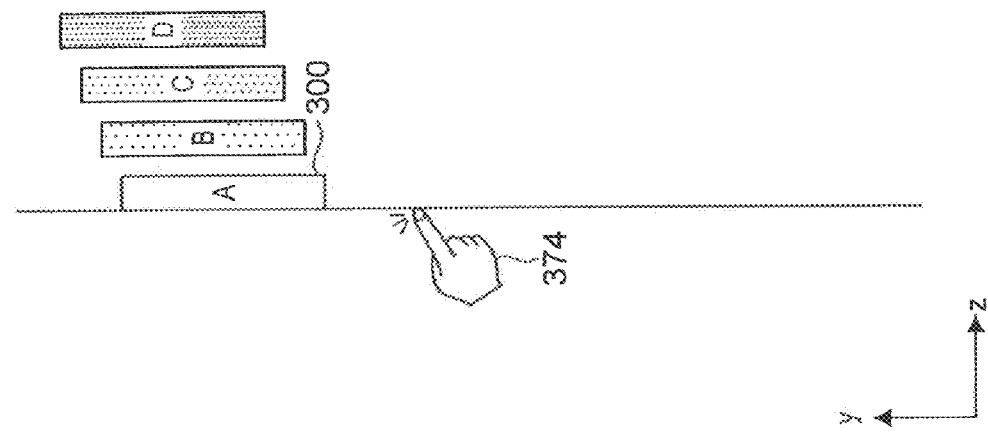

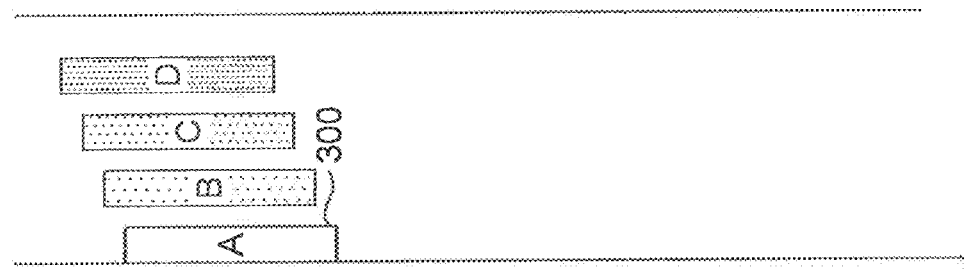
FIG.19D
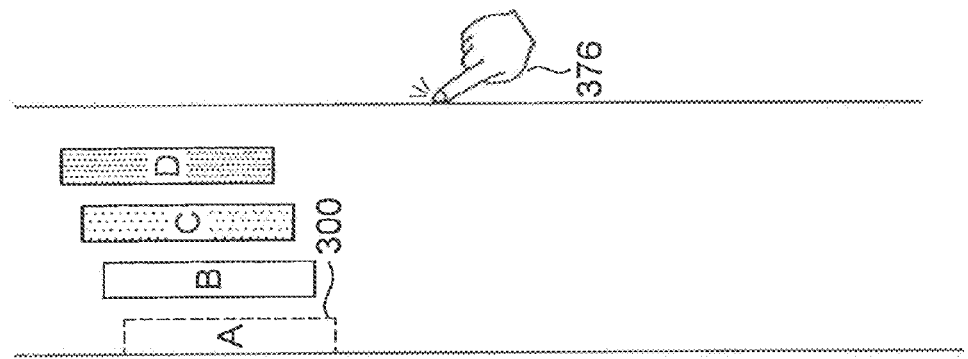
FIG.19C
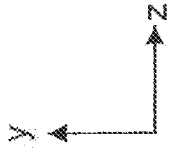

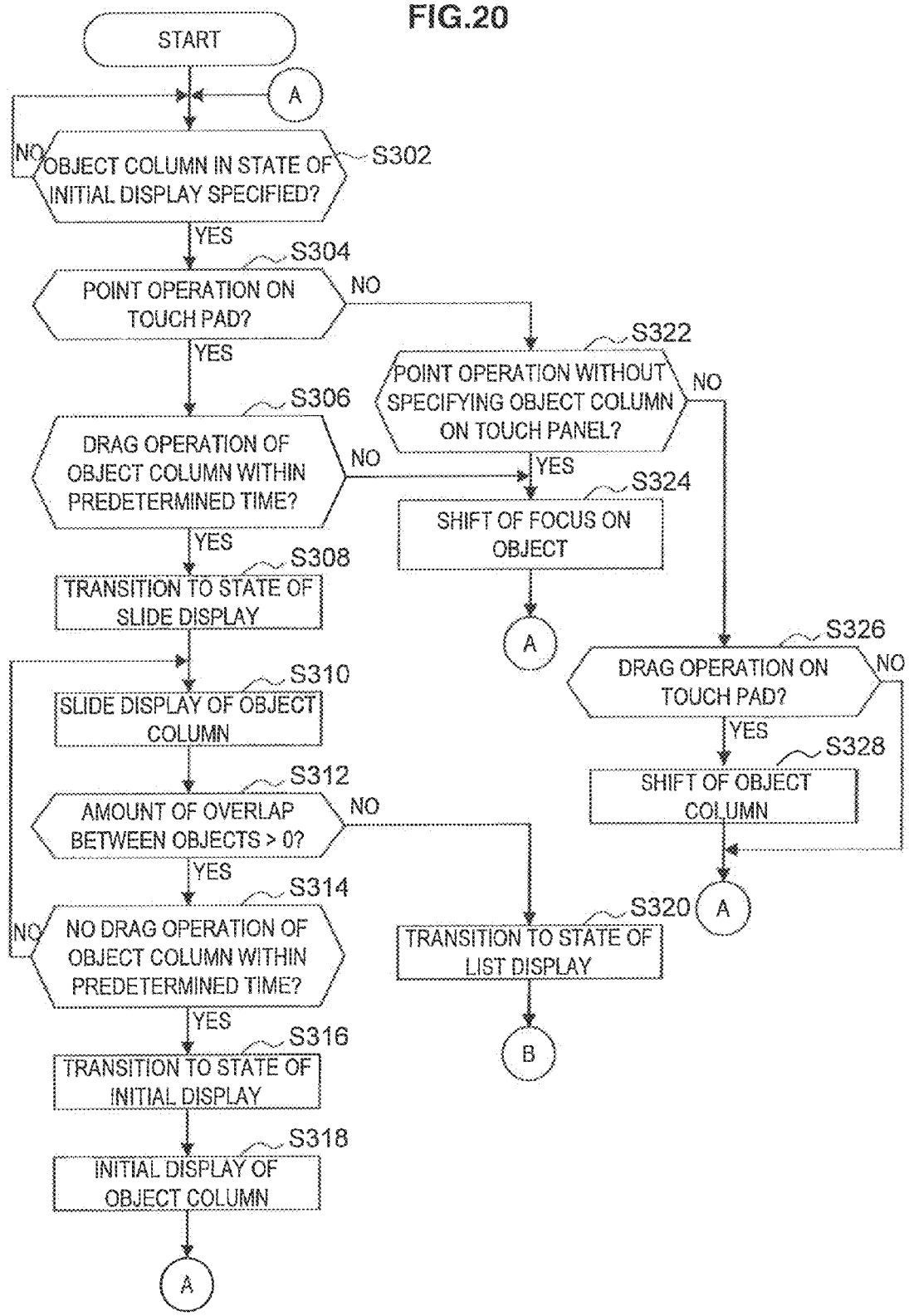

THREE-DIMENSIONAL SLIDING OBJECT ARRANGEMENT METHOD AND SYSTEM

CROSS REFERENCES TO RELATED APPLICATIONS

The present invention contains subject matter related to Japanese Patent Applications JP 2007-317720 and JP 2008-175839 filed in the Japan Patent Office on Dec. 7, 2007 and Jul. 4, 2008, respectively, the entire contents of which being incorporated herein by reference.

BACKGROUND OF THE INVENTION

Field of the Invention

The present invention relates to an information display terminal, an information display method and a program.

Graphical user interface (GUI) is known as a type of user interface which provides an operating environment with excellent visibility and operability where intuitive operation is possible. GUI has a bit map screen on the computer as a desktop, arranges such objects as window, icon and menu on the desktop, so that the arranged objects can be freely operated using a pointing device, such as a mouse or a touch pad. Today, the desktop is realized as a three-dimensional virtual space, and thus, such an operating environment as a real world can be built, and three-dimensional GUI having improved visibility and operability have been put into practice.

In three-dimensional GUI in the related art, objects are designated or moved through operation on the object in the three-dimensional virtual space, so that the viewpoint at which an object is projected in the three-dimensional virtual space can be operated and changed and a specific object is displayed.

Here, the projection plane in such a state that no operation is being carried out on the viewpoint is the reference projection plane, and the left-right direction on the display screen in a state where the reference projection plane is displayed is the x axis, the up-down direction is the y axis, and the depth direction is the z axis. In this case, the operation of an object and viewpoint on the x axis and the y axis can be carried out using a pointer displayed on the display screen which links to the operation of the pointing device, so that a specific point is designated on the display screen or an object is moved in a state where a specific point is designated.

SUMMARY OF THE INVENTION

Meanwhile, the operation of an object and viewpoint on the z axis is carried out by providing a separate interface (device) from the pointing device used for the operation in the x axis and the y axis, such as GUI button and specific operation key, on the display screen. In this case, the operation on the x axis and y axis is intuitively carried out using a pointing device or the like, while the operation on the z axis is carried out using a separate interface (device), and therefore, an operating environment which can provide intuitive operation is lost.

In addition, in pointing devices in the related art, acceleration of the movement of the pointing device is detected in the case where the designated specific point is moved, and the movement of the pointer is controlled in accordance with the detected acceleration of the movement. However, in the interface (device), for example the GUI button or specific key provided for operation on the z axis, the acceleration of the movement of the interface (device) cannot be detected in the case where the designated specific point is moved.

In addition, particularly in three-dimensional GUI, front objects close to the viewpoint onto which the three-dimensional virtual space is projected easily block objects in the rear which are far from the viewpoint onto which the three-dimensional virtual space is projected in the case where a large number of objects are provided in the three-dimensional virtual space. Therefore, such operation as designation or movement of a specific object on the display screen becomes difficult, and the visibility and operability lower. In addition, the same issue arises with two-dimensional GUI in the case where a plurality of objects is provided so as to overlap in the depth on the display screen.

In addition, in the case where a specific object is selected from a plurality of grouped objects, irrespectively of whether the interface is a three-dimensional GUI or a two-dimensional GUI, in general, a group is designated, and after that an object included in the designated group is designated. However, in three-dimensional GUI, it becomes difficult to designate a group and an object seamlessly, due to restrictions in the operating environment and the display environment in some cases.

It is desirable to provide information display terminal, information display method and program having excellent visibility and operability which can provide an operating environment where intuitive operation is possible.

According to a first embodiment of the present invention, there is provided an information display terminal for displaying an object of a graphical user interface on a display screen including: a first operation information acquiring unit for acquiring first operation information including location information on the display screen via a contact detection surface provided so as to overlap with the display screen; a second operation information acquiring unit for acquiring second operation information including location information on the display screen via a contact detection surface provided on a surface on the side opposite to the display screen; and a display controlling unit for controlling the display of the object on the display screen on the basis of the acquired first operation information and second operation information.

In this configuration, first operation information including location information on the display screen is acquired via the contact detection surface provided so as to overlap with the display screen, and second operation information including location information on the display screen is acquired via the contact detection surface provided on the side opposite to the display screen. In addition, the display of the object on the display screen is controlled on the basis of the acquired first and second operation information. As a result, the display of the object on the display screen is controlled on the basis of the two pieces of operation information acquired via the two contact detection surfaces provided on the display screen and on the surface on the side opposite to the display screen, and therefore, an operating environment where intuitive operation is possible can be provided.

In addition, the above described object may be arranged within a three-dimensional coordinate space on the basis of three-dimensional coordinate information specific to the object, and the display controlling unit may control the display of the object on the display screen which is a surface onto which the three-dimensional coordinate space is projected. As a result, the display of the object on the display screen which is a surface to which the three-dimensional coordinate space is projected can be controlled, and therefore, an operating environment for a three-dimensional GUI can be provided.

In addition, a plurality of objects including the above described object may form an object column in which the objects are aligned in the direction of the first coordinate axis of the three-dimensional coordinate space so as to overlap, one of the first operation information and the second operation information may include first scroll information obtained in accordance with the degree of contact detected on the contact detection surface, and the display controlling unit may specify the object column on the basis of the location information included in the first operation information or the second operation information and control the display so that the plurality of objects included in the specified object column scroll in one direction on the first coordinate axis on the basis of the acquired first scroll information. As a result, the display is controlled so that a plurality of objects included in the object column scroll in one direction on the first coordinate axis on the basis of the first scroll information obtained in accordance with the degree of contact detected on the contact detection surface. Accordingly, the user can intuitively carry out a scroll operation for the objects in the three-dimensional GUI.

In addition, the other of the first operation information and the second operation information may include second scroll information obtained in accordance with the degree of contact detected on the contact detection surface, and the display controlling unit may control the display so that the plurality of objects included in the specified object column scroll in the other direction on the first coordinate axis on the basis of the acquired second scroll information. As a result, display can be controlled so that a plurality of objects included in the object column scroll in two directions on the first coordinate axis on the basis of the first and second movement information obtained in accordance with the degree of contact detected on the contact detection surface. Accordingly, the user can intuitively carry out a scroll operation on the objects in the three-dimensional GUI.

In addition, the degree of the contact may be obtained as the intensity of contact detected on the contact detection surface, and the display controlling unit may control the display so that the plurality of objects scroll in the case where the intensity of the contact exceeds a predetermined threshold value. As a result, the display can be controlled so that the objects scroll in the case where the intensity of contact exceeds a predetermined threshold value, and therefore, an instruction for a scroll operation can be intuitively input.

In addition, the degree of the contact may be obtained as the detection duration of contact detected on the contact detection surface, and the display controlling unit may control the acceleration of display on which the plurality of objects scroll on the basis of the detection duration of the contact. As a result, the acceleration of the display for scrolling the objects can be controlled on the basis of the detection duration of the contact, and therefore, the operability of the scroll operation can be improved.

In addition, the degree of the contact may be obtained as the detection area of the contact detected on the contact detection surface, and the display controlling unit may control the acceleration of display on which the plurality of objects scroll on the basis of the detection area of the contact. As a result, the acceleration of the display for scrolling the objects can be controlled on the basis of the detection area of the contact, and therefore, the acceleration of the display can be changed by continuously changing the area of contact so that the operability of the scroll operation can be further improved.

In addition, a plurality of objects may form an object column aligned in the direction of the first coordinate axis in the three-dimensional coordinate space so as to overlap, the first operation information may include first start point information and first end point information as location information obtained from the moving state of a contact point detected on the contact detection surface, the second operation information may include second start point information acquired at the same time as the first start point information and second end point information acquired at the same time as the first end point information as location information obtained from the moving state of a contact point detected on the contact detection surface, the display controlling unit may specify the frontmost object included in a specific object column on the display screen on the basis of the acquired first start point information, specify the rearmost object included in the object column on the basis of the acquired second start point information, link the acquired first end point information to a location to which the frontmost object moves, and link the acquired second end point information to a location to which the rearmost object moves, and thus control the display so that the plurality of objects included in the object column move in a plane perpendicular to the first coordinate axis. As a result, the display can be controlled so that a plurality of objects included in the object column move in a plane perpendicular to the first coordinate axis on the basis of the first and second start point information and the first and second end point information obtained from the moving state of the contact point detected on the contact detection surface. Accordingly, the user can prevent the visibility and the operability from lowering due to blocking of objects in the three-dimensional GUI.

In addition, the above described first operation information may include first start point information and first end point information as location information obtained from the moving state of a contact point detected on the contact detection surface, the second operation information may include second start point information acquired at the same time as the first start point information and second end point information acquired at the same time as the first end point information as location information obtained from the moving state of a contact point detected on the contact detection surface, and the display controlling unit may calculate the amount of change in the angle between the reference axis obtained from the acquired first start point information and the second start point information and the movement axis obtained from the acquired first end point information and the second end point information, and change the angle of the axis connecting the viewpoint indicating the frontmost apex of a pyramid which is a visual hull onto which the three-dimensional coordinate space is projected, and the reference point indicating the center of the projection surface on the basis of the calculated amount of change in angle, and thus control the display of the objects on the display screen which is the projection surface in such a state that the angle of the axis is changed relative to the three-dimensional coordinate space. As a result, the display of the objects on the display screen which is a surface onto which the three-dimensional coordinate space is projected in a state where the viewpoint is changed can be controlled on the basis of the first and second start point information and the first and second end point information obtained from the moving state of the contact point detected on the contact detection surface. Accordingly, the user can intuitively carry out an operation on the viewpoint in the three-dimensional GUI.

In addition, the above described object may be provided in a two-dimensional coordinate plane on the basis of two-dimensional coordinate information specific to the object and a plurality of objects form an object column which is aligned in such a manner that the objects at least partially overlap on the display screen, the first operation information may include first start point information and first end point information as location information obtained from the moving state of a contact point detected on the contact detection surface, the second operation information may include second start point information acquired at the same time as the first start point information and second end point information acquired at the same time as the first end point information as location information obtained from the moving state of a contact point detected on the contact detection surface, and the display controlling unit may specify the frontmost object included in a specific object column on the display screen on the basis of the acquired first start point information, specify the rearmost object included in the object column on the basis of the acquired second start point information, link the acquired first end point information to a location to which the frontmost object moves, and link the acquired second end point information to a location to which the rearmost object moves, and thus controls the display so that the plurality of objects included in the object column move and change the degree of overlap between the objects. As a result, the display can be controlled so that a plurality of objects included in the object column move while changing the degree of overlap between the objects on the basis of the first and second start point information and the first and second end point information obtained from the moving state of the contact point detected on the contact detection surface. Accordingly, the user can prevent the visibility and operability from lowering due to blocking of objects in the two-dimensional GUI.

In addition, the second operation region which is an object of operation on the contact detection surface provided on a surface on the side opposite to the display screen may be smaller than the first operation region which is an object of operation on the contact detection surface provided on the display screen, and the display controlling unit may make such an adjustment that the location information on the display screen obtained from the second operation region corresponds to the location information on the display screen obtained in the first operation region. As a result, such adjustment can be made that the location information on the display screen obtained from the second operation region corresponds to the location information on the display screen obtained from the first operation region, and therefore, the user can prevent the operability from lowering due to the difference in the range of the operation region.

In addition, an operation region information setting unit for setting operation region information for specifying the range of the second operation region on the basis of the second operation information acquired for each user may further be provided. As a result, the range of the second operation region can be set for each user, and therefore, the operability for each user can be increased.

In addition, an operation region information storing unit for storing the operation region information set by the operation region setting unit may further be provided. The display controlling unit may read out the operation region information for a specific user from the operation region information storing unit in response to a request for change from the specific user and set the range of the second operation region. As a result, the range of the second operation region can be set and stored for each user, and the range of the second operation region can be set for each user, and therefore, the operability for each user can be increased.

In addition, an operation region information storing unit for storing a number of pieces of operation region information in accordance with the direction in which the display screen is used may further be provided. The display controlling unit may determine the direction in which the display screen is used, read out the operation region information in accordance with the direction in which the display screen is used from the operation region information storing unit, and set the range of the second operation region. As a result, the range of the second operation region can be stored in accordance with the direction in which the display screen is used, and the range of the second operation region can be set in accordance with the results of determination in the direction in which the display screen is used, and therefore, the operability for each occasion of use can be improved.

In addition, the above described display control unit may determine the direction in which the display screen is used on the basis of the second operation information acquired from a user. As a result, the direction in which the display screen is used can be determined on the basis of the second operation information, and therefore, the operability for each occasion of use can be easily improved.

In addition, an acceleration sensor may further be provided. The display controlling unit may determine the direction in which the display screen is used on the basis of the results of detection by the acceleration sensor. As a result, the direction in which the display screen is used can be determined on the basis of the results of detection by the acceleration sensor, and therefore, the operability for each occasion of use can be improved.

In addition, a plurality of objects form an object column and the object column can be displayed in such a state that the plurality of objects are arranged in the initial location so as to overlap and the plurality of objects are aligned in slide location so as to at least partially overlap, and the display controlling unit may control the display for operating the object column and the display for operating the objects which form the object column, in accordance with the acquisition state of the first location information included in the first operation information and/or second location information included in the second operation information and the display state of the object column. As a result, the display for operating the object column and the objects can be controlled in accordance with the acquisition state of the first and/or second location information and the state of display of the object column, and therefore, the operation on the object column and the operation on the objects can be seamlessly carried out.

In addition, the display controlling unit may control the display of the object column so that the amount of overlap between the objects changes and the plurality of objects move in response to the continuous change in the first location information continuously acquired within a predetermined time after the acquisition of the second location information in the case where the second location information is acquired in such a state that the plurality of objects which form the object column are displayed in the initial location or in the slide location after the object column is specified by the first location information. As a result, the plurality of objects move and are displayed in response to the continuous change in the first location information in accordance with the acquisition state of the location information and the state of display of the object column while changing the amount of overlap between the objects. Accordingly, the amount of overlap between the objects is changed and displayed, and thus, the plurality of objects forming the object column can be confirmed.

In addition, the object placed on the front surface side on the display screen from among the plurality of objects which are placed in the above described object column so as to at least partially overlap may be displayed larger than the object placed on the rear surface side, and the display controlling unit may control the display of the object column so that the plurality of objects move while changing the amount of overlap between the objects in response to the continuous change in the first location information which is continuously acquired, and the smaller the amount of overlap between the objects is, the further the objects move to the front surface side and the larger the objects are displayed, while the greater the amount of overlap between the objects is, the further the objects move to the rear surface side and the smaller the objects are displayed. As a result, a plurality of objects move in response to the continuous change in the first location information while changing the amount of overlap between the objects, and then move to the front surface side or rear surface side in accordance with the amount of overlap between the objects so as to be displayed. Accordingly, the amount of overlap between the objects and the arrangement in the front-rear direction can be changed for the display, and thus, the plurality of objects forming the object column can be confirmed.

In addition, the object placed on the front surface side on the display screen from among the plurality of objects which are placed in the above described object column so as to at least partially overlap may be displayed larger than the object placed on the rear surface side, and the display controlling unit may control the display of the object column so that the plurality of objects move to the frontmost surface side so as to be displayed in a list with the same size in the case where the plurality of objects forming the object column are arranged so as not to overlap for display. As a result, the plurality of objects move to the frontmost surface side and are displayed in a list with the same size, and therefore, an operation can be the objects without lowering the visibility.

In addition, the above described display controlling unit may control the display of the object column so that the plurality of objects are displayed larger as the objects move to the front surface side. As a result, the plurality of objects are displayed larger as they move further to the front surface side, and therefore, an operation can be carried out on the objects without lowering the visibility.

In addition, the above described display controlling unit may control the display of the objects so that the contents of the objects are displayed in the case where the objects are specified by the first location information in such a state that the plurality of objects are displayed in a list. As a result, the contents of a specified object are displayed in such a state that a plurality of objects are displayed in a list, and therefore, an operation can be carried out on the objects without lowering the visibility and the operability.

In addition, the above described display controlling unit may control the display of the object column so that the plurality of objects forming the object column move to the initial location and are aligned in such a manner as to overlap in the case where the first and second location information is not acquired within a predetermined period in such a state that the plurality of objects forming the object column are displayed in the slide location after the object column is specified by the first location information. As a result, the plurality of objects forming the object column move to the initial location and aligned so as to overlap, unless location information is acquired in a state where the plurality of objects are displayed in a slide location, and therefore, the visibility can be prevented from lowering due to blocking of objects.

In addition, the above described display controlling unit may control the display of the object column so that the object column moves in response to the continuous change in the first location information which is continuously acquired in a state where the plurality of objects forming the object column are displayed in the initial location after the object column is specified by the first location information. As a result, the plurality of objects move and are displayed in response to the continuous change in the first location information in accordance with the acquisition state of the location information and the state of display of the object column, and therefore, a moving operation can be carried out on the object column.

In addition, the above described display controlling unit may control the display of the objects so that the focus of which the object is one of the plurality of objects forming the specified object column shifts to another object placed on one of the front surface side or the rear surface side of the object on the display screen which is the object of focus in the case where the first location information is acquired, and shifts to another object placed on the other of the front surface side or the rear surface side of the object on the display screen which is the object of focus in the case where the second location information is acquired when the first location information or the second location information which do not specify object column is acquired in such a state that the plurality of objects forming the object column are displayed in the initial location after the object column is specified by the first location information. As a result, the focus on the plurality of objects shifts either to the front surface side or to the rear surface side in accordance with the movement information when first or second movement information is acquired in a state where a plurality of objects are displayed in the initial location, and therefore, a focus operation can be intuitively carried out on the objects.

According to a second embodiment of the present invention, there is provided an information display method for displaying an object of a graphical user interface on a display screen, including the steps of: acquiring first operation information including location information on the display screen via a contact detection surface provided so as to overlap with the display screen; acquiring second operation information including location information on the display screen via a contact detection surface provided on a surface on the side opposite to the display screen; and controlling the display of the object on the display screen on the basis of the acquired first operation information and second operation information.

According to a third embodiment of the present invention, there is provided a program that causes a computer to execute the information display method according to the above described second embodiment of the present invention.

According to the embodiments of the present invention described above, there can be provided an information display terminal, an information display method and a program having excellent visibility and operability, which provide an operating environment where intuitive operation is possible.

BRIEF DESCRIPTION OF THE DRAWINGS

FIG. 2 is a block diagram showing the configuration of the main functions of the information display terminal;

FIG. 3 is a diagram illustrating a display screen of the information display terminal;

FIG. 6 is a diagram showing the third function which is characteristic for the information display terminal;

FIG. 8 is a diagram showing a display screen in a state where the viewpoint at which the three-dimensional coordinate space is projected is changed;

FIG. 11A is a diagram illustrating a sliding operation (state of initial display→state of list display) on an object column;

FIG. 11B is a diagram illustrating a sliding operation (state of initial display→state of list display) on an object column;

FIG. 12A is a diagram illustrating a sliding operation (state of list display→state of contents display) on an object column;

FIG. 12B is a diagram illustrating a sliding operation (state of list display→state of contents display) on an object column;

FIG. 13A is a diagram illustrating a sliding operation (state of slide display→state of initial display) on an object column;

FIG. 13B is a diagram illustrating a sliding operation (state of slide display→state of initial display) on an object column;

FIG. 18A is a diagram illustrating a moving operation on an object column;

FIG. 18B is a diagram illustrating a moving operation on an object column;

FIG. 19A is a diagram illustrating a focusing operation on an object;

FIG. 19B is a diagram illustrating a focusing operation on an object;

FIG. 19C is a diagram illustrating a focusing operation on an object;

FIG. 19D is a diagram illustrating a focusing operation on an object;

FIG. 20 is a flow chart showing the flow of the operation in the case where an object column is changed from the state of initial display to the state of list display.

Figure 1A:
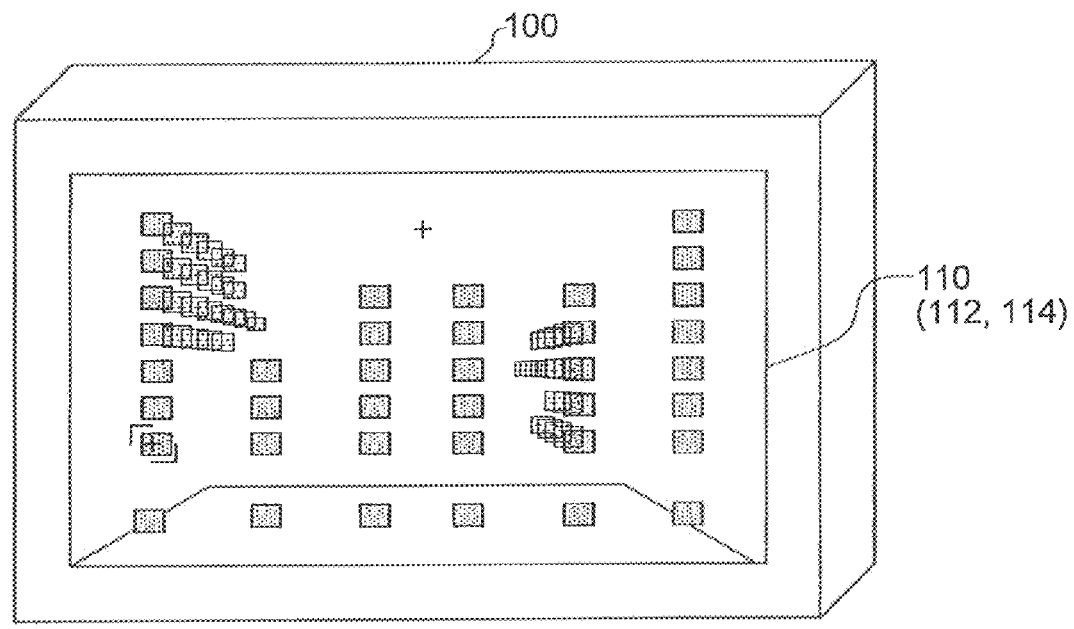
FIG. 1A is a diagram showing an information display terminal according to the first embodiment of the present invention.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

FIRST EMBODIMENT

Configuration of Information Display Terminal 100

Figure 1B:
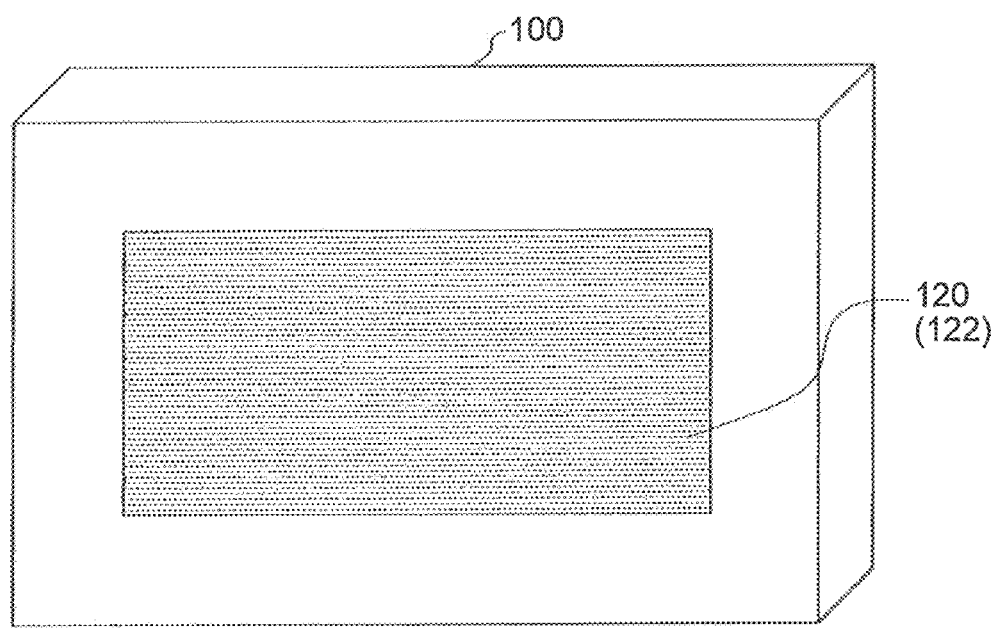
FIG. 1B is a diagram showing an information display terminal according to the first embodiment of the present invention.

FIGS. 1A and 1B are diagrams showing the information display terminal 100 according to the first embodiment of the present invention.

The information display terminal 100 is a portable apparatus, for example a portable information terminal, such as PDA (personal digital assistant) or an electronic organizer, a portable communication terminal or a portable music player terminal. As shown in FIGS. 1A and 1B, the information display terminal 100 has a main body in panel form and, as shown in FIGS. 1A and 1B, a touch panel 110 is provided on one surface of the main body and a touch pad 120 is provided on the other surface, which is the side opposite to the touch panel 110.

The touch panel 110 is a pointing device for inputting first location information on the display screen 114 where a contact sensor 112, for example a matrix switch, and a display screen 114, for example a liquid crystal display, are combined. The touch pad 120 is a pointing device for inputting the second location information on the display screen 114, and has a contact sensor 122 in plate form. The display screen 114 displays such objects as window, icon and menu forming a GUI.

The touch panel 110 is provided with the contact sensor 112 which overlaps with the display screen 114, so that the first contact point is detected via the contact sensor 112 when the user touches a specific point on the display screen 114 with a finger or the like, and the first location information on the display screen 114 corresponding to the first contact point is input. Meanwhile, on the touch pad 120, a second contact point is detected via the contact sensor 122 when the user touches a specific point on the contact sensor 122 with a finger or the like, and the second location information on the display screen 114 corresponding to the second contact point is input.

Here, the touch panel 110 and the touch pad 120 may have the same area or different areas. In addition, the touch panel 110 and the touch pad 120 may be used in either direction, longitudinal or lateral.

FIG. 2 is a block diagram showing the configuration of the main functions of the information display terminal 100.

As shown in FIG. 2, the information display terminal 100 is formed so as to include a first operation information acquiring unit 132, a second operation information acquiring unit 134, a storing unit 136, a display unit 138, a control unit 140 and a display controlling unit 142, in addition to the touch panel 110 and the touch pad 120.

The first operation information acquiring unit 132 acquires first operation information which includes first location information on the display screen 114 via the contact detection surface provided so as to overlap with the display screen 114 (contact sensor 112 of touch panel 110). The second operation information acquiring unit 134 acquires second operation information which includes second location information on the display screen 114 via the contact detection surface provided on the surface on the side opposite to the display screen 114 (contact sensor 122 of touch pad 120). The storing unit 136 is formed as a storing memory, such as a RAM or a ROM, and stores various types of data, such as a program for making the information display terminal 100 function and coordinate information on the objects. The display unit 138 displays objects of the GUI on the display screen 114. The control unit 140 includes a display control unit 142 and controls the functions of the entire information display terminal 100. The display control unit 142 controls the display of the objects on the display screen 114 on the basis of the first operation information and the second operation information acquired by the first and second operation information acquiring units 132 and 134.

In addition, the information display terminal 100 of which the details are described below is formed so as to selectively include an operation region information setting unit 152, an operation region information storing unit 154 and an acceleration sensor 156.

(Basic Operation of Information Display Terminal 100)

FIG. 3 is a diagram illustrating the display screen 114 of the information display terminal 100. Here, though FIG. 3 shows an example where icons of the GUI are displayed on the display screen 114, the operation is the same in the case where other objects, such as window, menu or the like, are displayed.

In the case where a three-dimensional GUI is realized in the information display terminal 100, objects are provided within the three-dimensional coordinate space on the basis of three-dimensional coordinate information and region information specific to the objects and displayed on the display screen 114, which is a surface onto which the three-dimensional coordinate space is projected, through a coordinate converting process from the three-dimensional coordinate space to the two-dimensional coordinate plane.

In the following, the projection plane in a state where objects are displayed on the display screen 114 shown in FIG. 3 is a reference projection plane, and the left-right direction on the display screen 114 in a state where the reference projection plane is displayed is the x axis, the up-down direction is the y axis and the direction of the depth is the z axis.

On the display screen 114 shown in FIG. 3, folders containing data, such as contents (for example folders 211), are aligned in a matrix in the x-y axis plane as icons of the GUI, and data 212 to 216 included in the folders 211 are aligned behind the folders 211. Here, the folders 211 have such a z axis coordinate value that it is displayed to the front closest to the viewpoint in a state where the reference projection plane is displayed, and data 212 to 216 have such a z axis coordinate value that they are displayed so as to overlap in the rear of the folder 211 far from the viewpoint. In the following, a plurality of objects 211 to 216 aligned so as to overlap on the z axis, which include the folders 211 and data 212 to 216, are referred to as object columns 210.

A first pointer 250 is displayed on the display screen 114 so as to correspond to the first location information input through the touch panel 110, and a second pointer 255 is displayed on the display screen 114 so as to correspond to the second location information input through the touch pad 120.

The basic operation process carried out on the information display terminal 100 is described below. When the user touches a specific point on the display screen 114, that is to say, on the touch panel 110, a first contact point is detected via the contact sensor 112 on the touch panel 110, so that the first operation information acquiring unit 132 acquires first location information indicating the location on the display screen 114 corresponding to the first contact point that is detected. In addition, when the user touches a specific point on the touch pad 120, a second contact point is detected via the contact sensor 122 on the touch pad 120, so that the second operation information acquiring unit 134 acquires second location information indicating the location on the display screen 114 corresponding to the second contact point that is detected.

Here, in the case where the contact sensor 122 of the touch pad 120 has a different area from the contact sensor 112 on the touch panel 110, the second location information input through the contact sensor 122 on the touch pad 120 is adjusted so that it can be input as location information indicating a specific point on the display screen 114. The details will be described below.

When the first or second location information is acquired, the display controlling unit 142 controls the display unit 138 so that the first or second pointer 250 or 255 is displayed on the display screen 114 corresponding to the acquired first or second location information. In addition, the display controlling unit 142 converts location information obtained as coordinate information on the two-dimensional coordinate plane to coordinate information in the three-dimensional coordinate space. Here, the display controlling unit 142 determines that the front object closest to the viewpoint is designated in the case where a plurality of objects can be specified from the first location information, while the portion corresponding to the background farthest from the viewpoint is designated in the case where no object can be specified. Likewise, the display controlling unit 142 determines that the object farthest from the viewpoint is designated in the case where a plurality of objects can be specified from the second location information, while the portion corresponding to the background closest to the viewpoint is designated in the case where no object can be specified. As a result, the display controlling unit 142 specifies the objects designated by the first and/or second pointer 250 and 255 and the portion corresponding to the background.

(First Function)

Figure 4A:
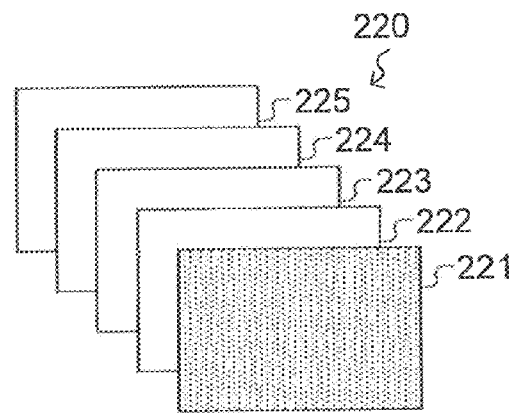
FIG. 4A is a diagram showing the first function which is characteristic for the information display terminal.
Figure 4B:
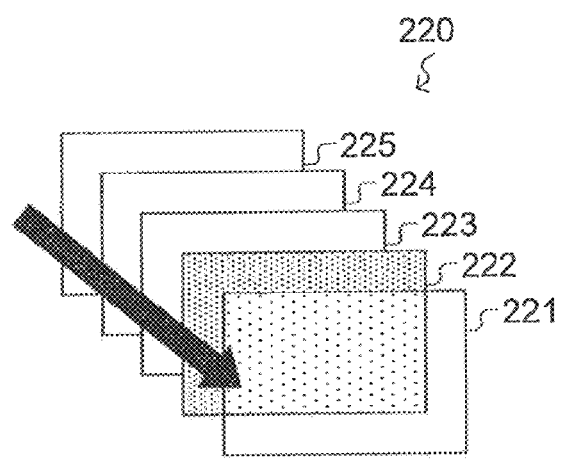
FIG. 4B is a diagram showing the first function which is characteristic for the information display terminal.
Figure 4C:
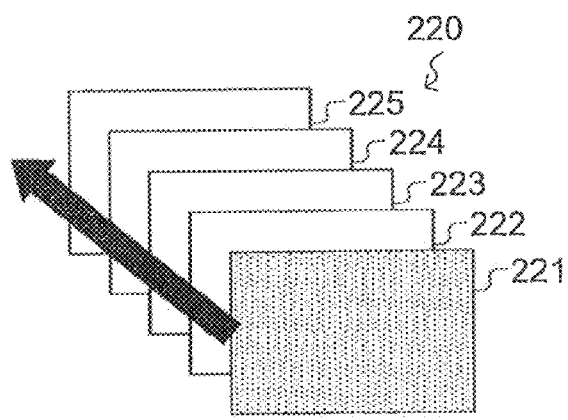
FIG. 4C is a diagram showing the first function which is characteristic for the information display terminal.

FIGS. 4A to 4C are diagrams illustrating the first function which is characteristic for the information display terminal 100. The information display terminal 100 has a function of scrolling a plurality of objects 221 to 225 included in a specific object column 220 on the z axis.

FIGS. 4A to 4C show an object column 220 which is specified through the operation of the touch panel 110 or the touch pad 120. In FIGS. 4A to 4C, objects which draw the user's attention (which are focused on) are hatched. FIG. 4A shows a state where the front object 221 closest to the viewpoint included in the object column 220 draws the user's attention (corresponds to a state where the reference projection plane is displayed). FIGS. 4B and 4C show a state where a plurality of objects 221 to 225 included in the object column 220 scroll on the z axis.

As shown in FIG. 4A, a plurality of objects 221 to 225 included in the object column 220 are aligned on the Z axis so as to overlap in the three-dimensional GUI, and therefore, the objects 222 to 225 located in the rear are easily blocked by the object 221 placed in the front, and thus, the visibility and the operability lower.

In order to realize the first function, at least one of the touch panel 110 and the touch pad 120 detects a contact point via the contact sensor 112 or 122 and the degree of contact. In the following, a case where both the touch panel 110 and the touch pad 120 detect the degree of contact is described.

The operation process relating to the first function is described below. When the user strongly presses any point on the display screen 114 in such a state that a specific object column 220 is designated, the intensity of contact, which is shown as the pressure value of the contact or the amount of current of static electricity resulting from contact, for example, is detected via the contact sensor on the touch panel 110, and the first operation information acquiring unit 132 acquires the intensity of the detected contact as first scroll information. In addition, when the user strongly presses any point on the touch pad 120 in such a state that a specific object column 220 is designated, the intensity of contact is detected via the contact sensor 122 on the touch pad 120, so that the second operation information acquiring unit 134 acquires the detected intensity of contact as second scroll information.

When the first or second scroll information is acquired, the display controlling unit 142 determines that a scrolling instruction has been input in the case where the intensity of contact represented by the acquired scroll information exceeds a predetermined threshold value. Meanwhile, the display controlling unit 142 determines that location information has been input instead of scroll information and controls the display unit 138 in the case where the intensity of contact which is represented by the acquired scroll information is less than a predetermined threshold value.

In addition, in the case where second scroll information which exceeds a predetermined threshold value is acquired, the display controlling unit 142 controls the display unit 138 so that a plurality of objects 221 to 225 included in the object column 220 scroll by one object to the front of the display screen 114, as shown in FIG. 4B. Furthermore, in the case where first scroll information which exceeds a predetermined threshold value is acquired in the state shown in FIG. 4B, the display controlling unit 142 controls the display unit 138 so that a plurality of objects 221 to 225 included in the object column 220 scroll by one object to the rear of the display screen 114, as shown in FIG. 4C. Here, the display controlling unit 142 adjusts the z axis coordinate information specific to the objects 221 to 225 so that it increases or decreases at the time when the objects 221 to 225 are scrolled, and controls the display unit 138 so that the objects 221 to 225 are displayed in the projection plane on the basis of the adjusted z axis coordinate information.

The user shifts his/her attention to the object one object before or after (for example the object 222 or object 221) through a scrolling operation. Here, the display controlling unit 142 controls the display unit 138 so that the object 221 located to the front of the object 222 to which the user is paying attention becomes transparent. As a result, the object 222 to which the user is paying attention is not blocked by the object 221 located in front, and thus, the visibility and the operability can be prevented from lowering.

In addition, the display controlling unit 142 may control the acceleration of the display where the objects 221 to 225 scroll on the basis of the detection duration of the contact detected via the contact sensors 112 and 122. In this case, the longer the detection duration is, the greater the acceleration of scrolling can be made. Here, in the case where the detection duration of the contact is less than a predetermined threshold value, it is determined that location information has been input and the display unit 138 is controlled. As a result, the user keeps touching the contact sensors 112 and 122 with a finger or the like in the case where the user desires for the acceleration of scrolling to increase, while, the user releases his/her finger or the like from the contact sensors 112 and 122 in the case where the user desires for the acceleration to decrease, and thus, a scrolling operation can be intuitively carried out.

In addition, the display controlling unit 142 may control the acceleration of the display where the objects 221 to 225 scroll on the basis of the detection area of the contact which is detected via the contact sensors 112 and 122. In this case, the greater the detection area is, the greater the acceleration of scrolling can be made. Here, in the case where the detection area of contact is less than a predetermined threshold value, it is determined that location information has been input, and the display unit 138 is controlled. As a result, the user touches the contact sensors 112 and 122 with a finger cushion or the like in the case where the user desires for the acceleration of scrolling to increase, and touches the contact sensors 112 and 122 with a fingertip or the like in the case where the user desires for the acceleration to decrease, and thus, the scrolling operation can be intuitively carried out. In particular, the user can change the area of contact with the contact sensors 112 and 122 during one scrolling operation without releasing a finger from the contact sensors 112 and 122, and thus can continuously accelerate or decelerate the scrolling, and therefore, the scrolling operation can be carried out more intuitively.

Here, the first function can be used for the following applications, in addition to control of the display of the objects of the GUI, for example.

A case where the object column is a playlist including a plurality of objects made up of music files is assumed, for example. In this case, the display controlling unit 142 can control the function unit, for example a play processing unit, so that a playing process for the music file one file before or after the music file playing at the time can be carried out when the first or second scroll information exceeds a predetermined threshold value. Furthermore, the display controlling unit 142 can control the playing process for the music file playing at the time so that it fast-forwarded or rewound on the basis of the detection duration of the contact or the contact area detected via the contact sensors 112 and 122.

A case where the degree of contact is detected by both the touch panel 110 and the touch pad 120 so that the scrolling operation is controlled in two directions is described above.

However, similar operation is possible in the case where the degree of contact is detected by only one of the touch panel 110 and the touch pad 120, and the scrolling operation is controlled in one direction. Here, in the case where the scrolling operation is controlled in one direction, the plurality of objects 221 to 225 included in the object column 220 may be scrolled in a rotating manner so that scrolling is continuously performed between the frontmost object 221 and the rearmost object 225. In addition, the objects may be scrolled in a reversed manner, so that the direction of scrolling is reversed at the frontmost and rearmost objects 221 and 225.

(Second Function)

FIGS. 5A to 5D are diagrams illustrating the second function which is characteristic for the information display terminal 100. The information display terminal 100 has a function of moving a plurality of objects 231 to 235 included in a specific object column 230 in the x-y plane perpendicular to the z axis.

Figure 5A:
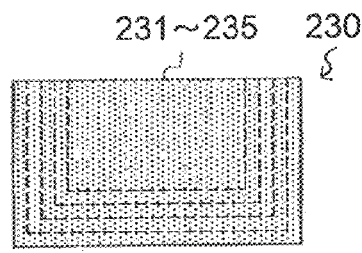
FIG. 5A is a diagram showing the second function which is characteristic for the information display terminal.
Figure 5B:
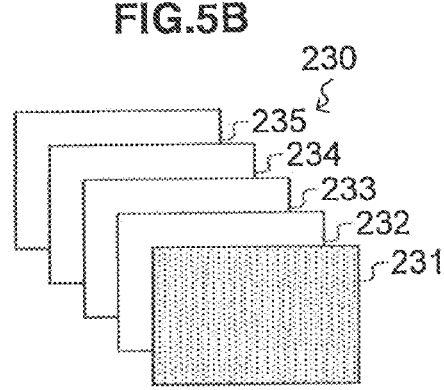
FIG. 5B is a diagram showing the second function which is characteristic for the information display terminal.
Figure 5C:
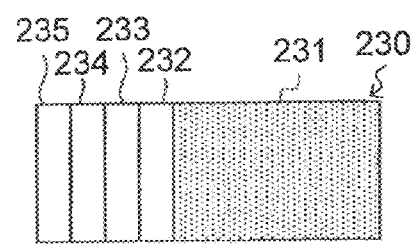
FIG. 5C is a diagram showing the second function which is characteristic for the information display terminal.
Figure 5D:
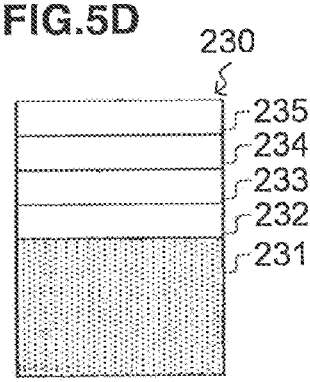
FIG. 5D is a diagram showing the second function which is characteristic for the information display terminal.

FIG. 5A shows a state of the object column 230 displayed on the reference projection plane, FIG. 5B shows a state where the objects 231 to 235 are moved on the x axis and the y axis, FIG. 5C shows a state where the objects 231 to 235 are moved on the x axis, and FIG. 5D shows a state where the objects 231 to 235 are moved on the y axis. Here, FIG. 5A corresponds to a case where the x axis coordinates and the y axis coordinates respectively coincide between a viewpoint 240 which will be described below and the reference point 242, FIG. 5B corresponds to a case where the x axis coordinates and the y axis coordinates are respectively shifted, FIG. 5C corresponds to a case where the x axis coordinates are shifted, and FIG. 5D corresponds to a case where the y axis coordinates are shifted.

As shown in FIG. 5A, a plurality of objects 231 to 235 included in the object column 230 are aligned so as to overlap on the z axis, and therefore, the objects 232 to 235 located in the rear are easily blocked by the object 231 located in the front, and thus, the visibility and the operability lower.

In order to realize the second function, the touch panel 110 and the touch pad 120 detect the moving state of the contact point on the contact sensors 112 and 122.

The operation process relating to the second function will be described below. Such a state is assumed that the frontmost object 231 included in a specific object column 230 is designated by the first pointer 250, and at the same time, the rearmost object 235 is designated by the second pointer 255. Here, the first operation information acquiring unit 132 acquires the point on the display screen 114 which is designated by the first pointer 250 as the first start point information, and the second operation information acquiring unit 134 acquires the point on the display screen 114 which is designated by the second pointer 255 as the second start point information.

When the user moves the contact point on the touch panel 110 with a finger or the like in a state where the frontmost and rearmost objects 231 and 235 are designated at the same time, the contact point after being moved is detected via the contact sensor 112 on the touch panel 110, and the first operation information acquiring unit 132 acquires the first end point information indicating the point on the display screen 114 corresponding to the contact point that is detected. In addition, when the user moves the contact point of a finger or the like over the contact sensor 122 on the touch pad 120, the contact point after being moved is detected via the contact sensor 122 on the touch pad 120, and the second operation information acquiring unit 134 acquires the second end point information indicating the point on the display screen 114 corresponding to the contact point that is detected.

When the first and second end point information is acquired at the same time, the display controlling unit 142 controls the display unit 138 so that the first and second pointers 250 and 255 are displayed on the display screen 114 so as to correspond to the acquired first and second end point information. In addition, the display controlling unit 142 converts the end point information which is acquired as coordinate information on the two-dimensional coordinate plane to coordinate information in a three-dimensional coordinate space. Here, the z axis coordinate for the first and second end point information does not change from the z axis coordinate for the first and second start point information. Thus, the converted coordinate information is used as the coordinate information to which the frontmost and rearmost objects 231 and 235 in the object column 230 are moved, and the coordinate information to which the other objects 232 to 234 which are included in the object column 230 are moved is calculated.

Then, the display controlling unit 142 makes an adjustment so that the coordinate information specific to the objects 231 to 235 included in the object column 230 increases or decreases on the x axis and the y axis as shown in FIG. 5B, the coordinate information increases or decreases on the x axis as shown in FIG. 5C, and the coordinate information increases or decreases on the y axis as shown in FIG. 5D, and the display unit 138 is controlled so that the objects 231 to 235 are displayed on the projection plane on the basis of the coordinate information that has been adjusted.

The user moves the plurality of objects 231 to 235 included in the object column 230 on the x-y plane perpendicular to the z axis, and thus, expands the objects 231 to 235 which are aligned so as to overlap for display or aligns the objects so that they overlap for display. As a result, the user can easily see and operate the plurality of objects 231 to 235 included in the object column 230, and in addition, the display region on the display screen 114 can be effectively used.

Here, the second function can be applied in the same manner in the case where the two-dimensional GUI is implemented on the information display terminal 100. In this case, the respective objects are provided on a two-dimensional coordinate plane on the basis of the two-dimensional coordinate information and the region information specific to the objects and displayed on the display screen 114 which corresponds to the two-dimensional coordinate plane.

In the case where a plurality of objects are aligned so as to at least partially overlap in the two-dimensional GUI (a plurality of objects which are aligned in this manner are also referred to as object column), the objects placed in the rear are easily blocked by the objects placed in the front, and thus, the visibility and the operability lower.

Accordingly, in the same manner as in the case of the three-dimensional GUI, a plurality of objects included in a specific object column are moved in such a manner that the degree of overlap between the objects is changed on the basis of the first start point and end point information and the second start point and end point information and displayed, and thus, the visibility and the operability can be prevented from lowering due to the blocking of the objects in the two-dimensional GUI.

(Third Function)

FIG. 6 is a diagram illustrating the third function which is characteristic for the information display terminal 100. The information display terminal 100 has a function of changing the location of the viewpoint 240 onto which the three-dimensional coordinate space is projected.

FIG. 6 shows the relationship between the viewpoint 240 and the reference point 242 in terms of the three-dimensional coordinate space and the projection plane. As shown in FIG. 6, the viewpoint 240 indicates the frontmost apex of the pyramid 244 which is a visual hull onto which the three-dimensional coordinate space is projected, and the reference point 242 indicates the center of the projection plane 246.

In order to realize the third function in the same manner as the second function, the touch panel 110 and the touch pad 120 detect the moving state of the contact point on the contact sensors 112 and 122.

The operation process relating to the third function is described below. Such a state is assumed that the portion corresponding to the background, excluding the objects in the three-dimensional coordinate space, is designated by the first and second pointers 250 and 255 at the same time. Here, the first operation information acquiring unit 132 acquires the point on the display screen 114 designated by the first pointer 250 as the first start point information, and the second operation information acquiring unit 134 acquires the point on the display screen 114 designated by the second pointer 255 as the second start point information.

When the user moves the contact point with a finger or the like over the touch panel 110 in such a state that the first and second pointers 250 and 255 designate the background portion, the contact point after being moved is detected via the contact sensor 112 on the touch panel 110, and the first operation information acquiring unit 132 acquires the first end point information which indicates the point on the display screen 114 corresponding to the contact point that is detected. In addition, when the user moves the contact point with a finger or the like over the contact sensor 122 on the touch pad 120, the contact point after being moved is detected via the contact sensor 122 on the touch pad 120, and the second operation information acquiring unit 134 acquires the second end point information which indicates the point on the display screen 114 corresponding to the contact point that is detected.

When the first and second end point information are acquired at the same time, the display controlling unit 142 controls the display unit 138 so that the first and second pointers 250 and 255 are displayed on the display screen 114 so as to correspond to the first and second end point information that has been acquired. First, the display controlling unit 142 assumes a certain distance in the direction of the depth of the display screen 114 between the point on the display screen 114 which corresponds to the first start point information and the point on the display screen 114 which corresponds to the second start point information, as well as between the point on the display screen 114 which corresponds to the first end point information and the point on the display screen 114 which corresponds to the second end point information. Next, the display controlling unit 142 calculates the amount of change in the three-dimensional angle between the reference axis, which connects the point on the display screen 114 which corresponds to the first start point information and the point on the display screen 114 which corresponds to the second start point information, and the movement axis, which connects the point on the display screen 114 which corresponds to the first end point information and the point on the display screen 114 which corresponds to the second end point information. In addition, the display controlling unit 142 changes the angle of the axis which connects the viewpoint and the reference point on the basis of the calculated amount of change in the angle and calculates the coordinate information of the objects on the projection plane in such a state that the viewpoint is changed in the three-dimensional coordinate space.

Figure 7:
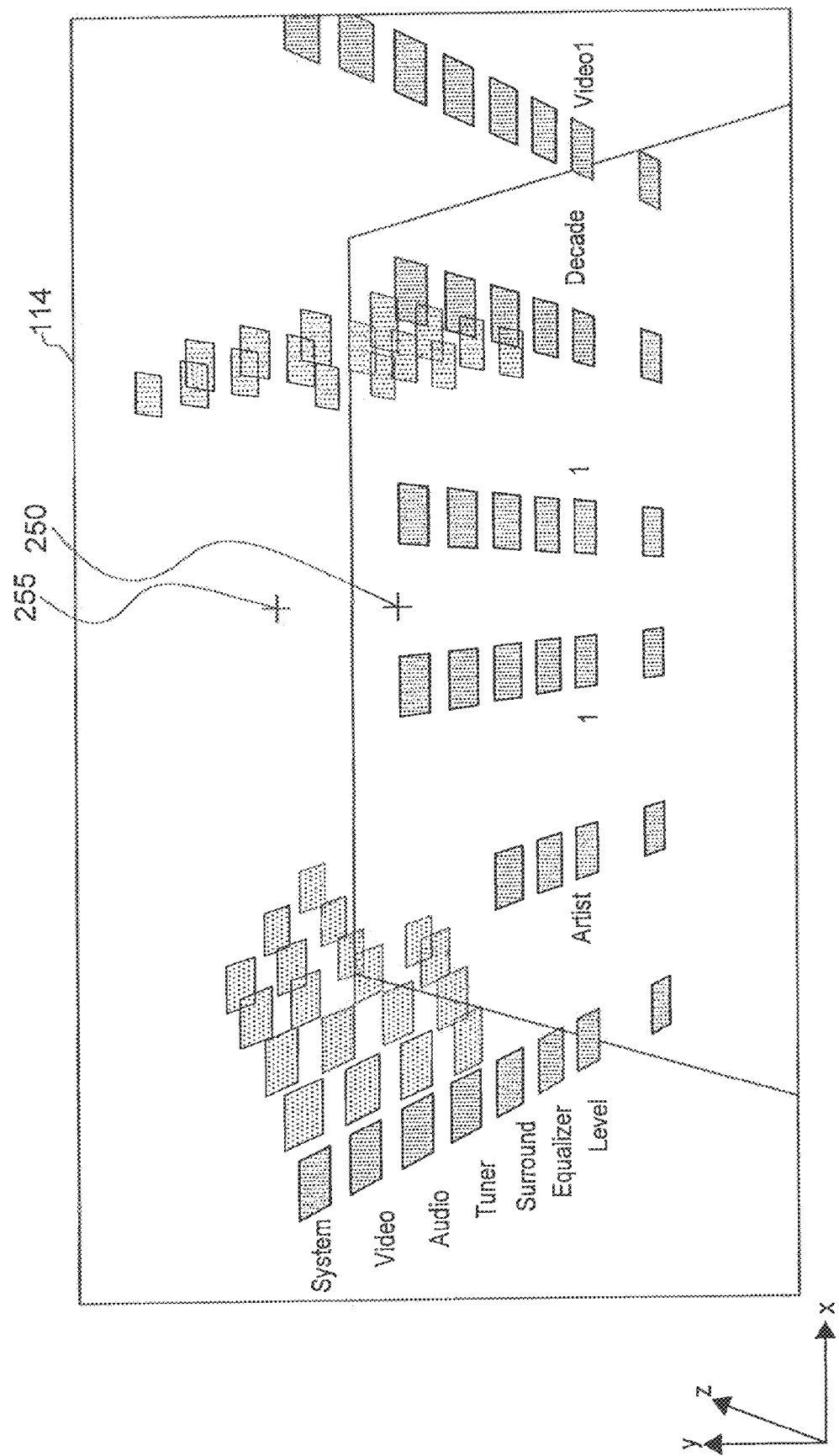
FIG. 7 is a diagram showing a display screen in a state where the viewpoint at which the three-dimensional coordinate space is projected is changed.

Thus, the display controlling unit 142 controls the display of objects on the projection plane 246 in accordance with the change in the viewpoint 240 that has been moved on the y axis as shown in FIG. 7, for example, and in addition, controls the display of objects on the projection plane 246 in accordance with the change of the viewpoint 240 that has been moved on the x axis as shown in FIG. 8, for example.

The user can intuitively carry out an operation on the viewpoint 240 in the three-dimensional GUI through the operation of the touch panel 110 and the touch pad 120. As a result, the user can freely change the viewpoint 240 onto which the three-dimensional coordinate space is projected, and thus, visually recognize and operate an object from the top, from the side, from the rear, in diagonal direction or the like.

(Fourth Function)

Figure 9A:
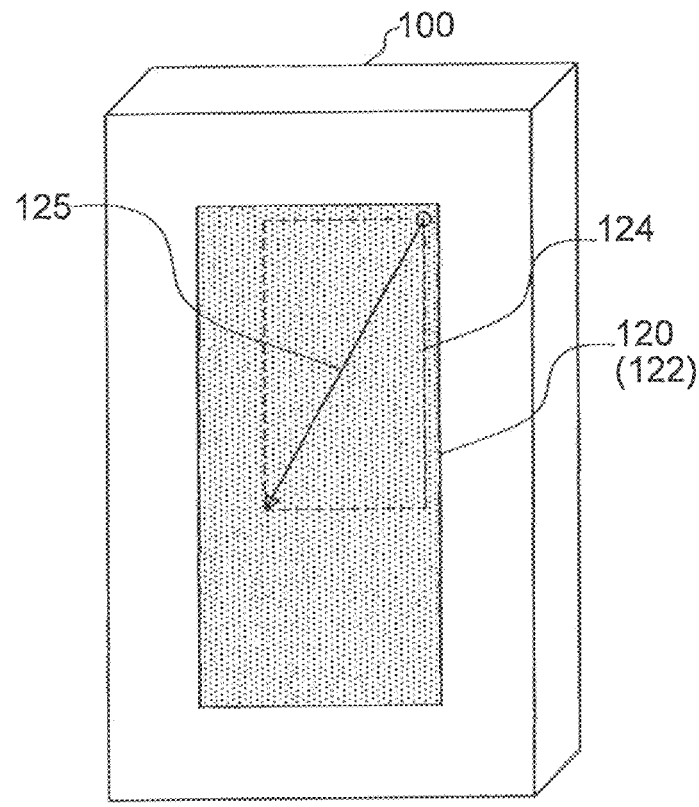
FIG. 9A is a diagram showing the fourth function which is characteristic for the information display terminal.
Figure 9B:
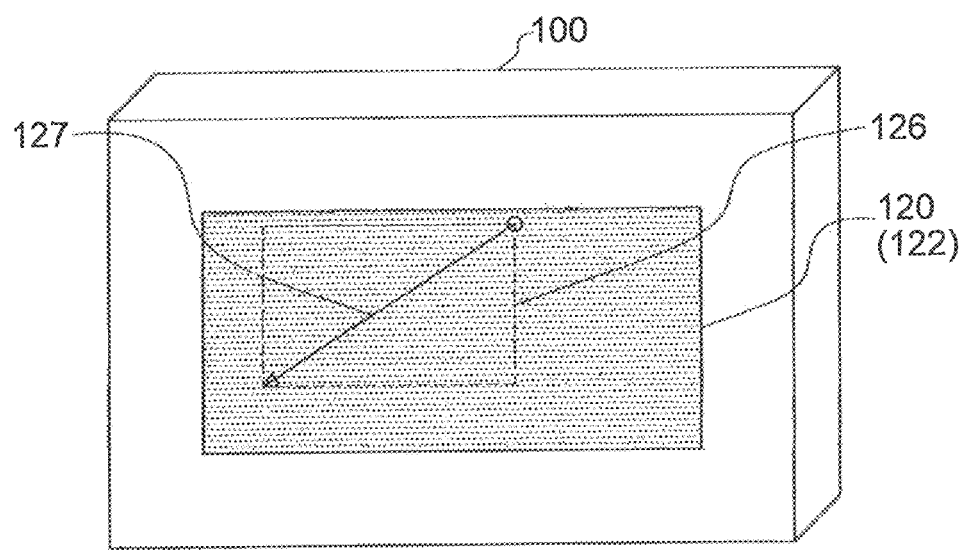
FIG. 9B is a diagram showing the fourth function which is characteristic for the information display terminal.

FIGS. 9A and 9B are diagrams illustrating the fourth function which is characteristic for the information display terminal 100. The information display terminal 100 has a function of adjusting the range in the operation region on the contact sensor 122 on the touch pad 120.

FIGS. 9A and 9B show regions 124 and 126 which are objects of operation on the touch pad 120 in the case where the display screen 114 is used in the longitudinal direction and the lateral direction, respectively.

Operation information is input into the information display terminal 100 via contact sensors 112, 122 provided on the both surfaces of the main body in such a state that the information display terminal 100 is held by one or two hands. Therefore, regions 124 and 126, which are objects of operation on the touch pad 120, depend on the size of the hands of the users and the state of the terminal held. In addition, the regions 124 and 126, which are objects of operation, may be different depending on the direction in which the terminal is used in the case where the display screen 114 is used in the longitudinal direction and the lateral direction. Accordingly, it is preferable for the operation region on the touch sensor 122 on the touch pad 120 to be adjusted depending on the user or how it is used.

In order to realize the fourth function, the information display terminal 100 is further provided with an operation region information setting unit 152 and an operation region information setting unit 152. The operation region information setting unit 152 sets the operation region information for specifying the range of the regions 124 and 126 for the actual operation on the touch pad 120 on the basis of the second operation information acquired for each user. The operation region information storing unit 154 stores the operation region information which is set by the operation region setting unit.

The operation region information setting unit 152 allows the user to input strokes for setting 125 and 127 in such a range that a finger naturally reaches on the touch pad 120 through, for example, a menu for setting. When the stroke for setting 125 or 127 is input, the contact point is detected at the start point and at the end point via the contact sensor 122 on the touch pad 120, and the second operation information acquiring unit 134 acquires the start point information and the end point information corresponding to the detected contact point.

When the start point information and the end point information are acquired, the operation region information setting unit 152 sets the quadrilateral region of which a diagonal line connects the points corresponding to the start point information and the end point information as an actual operation region 124 or 126 and stores it in the operation region information storing unit 154.

In addition, the display controlling unit 142 acquires information for making the actual range of the operation region 124 or 126 correspond to the range of the display screen 114. In the case where the display screen 114 is in a range of 10 cm×10 cm and the actual operation region 124 or 126 is in a range of 5 cm×5 cm, for example, the location information on the operation region 124 or 126 on the touch pad 120 is doubled and adjusted so as to correspond to the location information on the display screen 114.

In the case where the information display terminal 100 is used by a number of users, the operation region information storing unit 154 may store operation region information together with identification information for each user. In addition, the display controlling unit 142 reads out the operation region information corresponding to the user from the operation region information storing unit 154 in accordance with the request for change from a specific user and sets the range of the operation region 124 or 126.

In addition, the operation region information storing unit 154 may store operation region information in accordance with the direction in which the display screen 114 is used. In addition, the display controlling unit 142 determines the direction in which the display screen 114 is used, reads out the operation region information from the operation region information storing unit 154 in accordance with the direction in which the display screen 114 is used, and sets the range of the operation region 124 or 126. In this case, the display controlling unit 142 may determine the direction in which the display screen 114 is used on the basis of the type of data displayed on the display screen 114 or may determine the direction in which the display screen 114 is used on the basis of the information on the strokes for setting 125 or 127. In addition, in the case where an acceleration sensor 156, such as a gyroscope, is provided in the information display terminal 100, the direction in which the display screen 114 is used may be determined on the basis of the results of detection by the acceleration sensor 156.

As a result, the user can set the region 124 or 126 in which an actual operation is carried out on the touch pad 120 by himself/herself or such a region is automatically set so that an operation on the touch pad 120 can be carried out comfortably.

As described above, in the information display terminal 100 according to the first embodiment, the first operation information, including the location information on the display screen 114, is acquired via the contact sensor 112 on the touch panel 110, which is provided so as to overlap with the display screen 114, and the second operation information, including the location information on the display screen 114, is acquired via the contact sensor 122 on the touch pad 120, which is provided on the surface on the side opposite to the display screen 114. In addition, the display of objects on the display screen 114 is controlled on the basis of the first and second operation information that has been acquired.

As a result, the display of objects on the display screen 114 is controlled on the basis of the two pieces of operation information which are acquired via the two contact sensors 112 and 122 provided on the display screen 114 and on the surface on the side opposite to the display screen 114, and therefore, an operating environment which enables an intuitive operation can be provided.

SECOND EMBODIMENT

Next, the information display terminal 100 according to the second embodiment of the present invention is described. The information display terminal 100 according to the second embodiment has the same functional configuration as the information display terminal 100 according to the first embodiment.

The information display terminal 100 according to the present embodiment controls the display for operating an object column 310 (formed of a plurality of objects 300 which are grouped) and objects 300 in accordance with the operation state of the touch panel 110 and the touch pad 120 and the display state of the object column 310.

(Display Screen)

Figure 10:
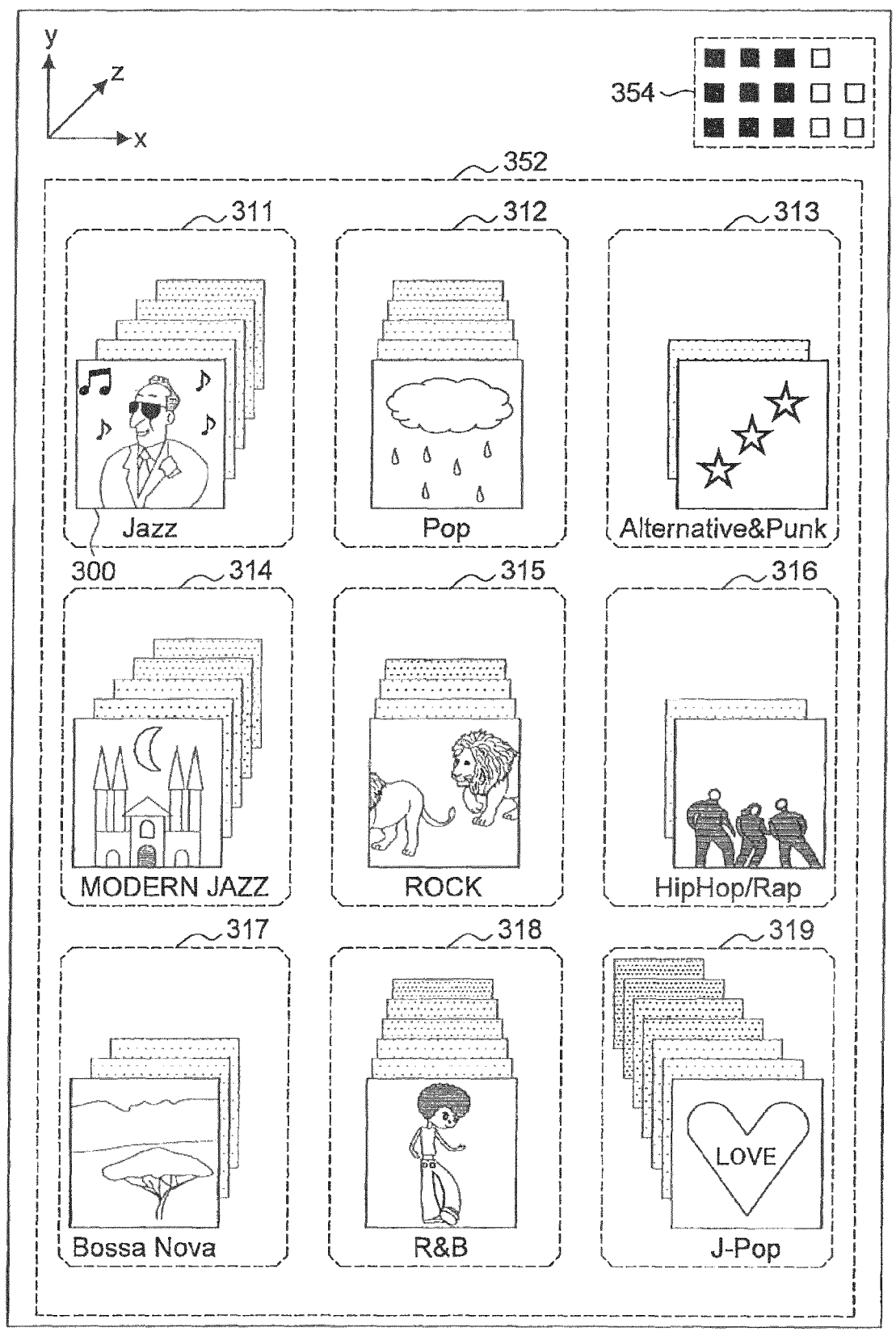
FIG. 10 is a diagram illustrating a display (state of initial display) on the touch panel of the information display terminal according to the second embodiment of the present invention.

FIG. 10 is a diagram illustrating the display on the touch panel 110 on the information display terminal 100. In the following, a case is described where images of musical album jackets are assumed to be objects 300 and a plurality of objects 300 showing musical albums which belong to the same genre are assumed to be object columns 310.

As shown in FIG. 10, there are an object display region 352 and a layout display region 354 on the touch panel 110. A number of object columns 311 to 319 (also referred to as object column 310 in the description of the present embodiment) formed of a plurality of objects 300 are displayed in the object display region 352. In the layout display region 354, the layout of the object columns 310 displayed in the object display region 352 are displayed as the icons.

As shown in FIG. 10, nine object columns 311 to 319 are displayed so as to correspond to nine genres, such as jazz, pop and the like, in the object display region 352. In the layout display region 354, the layout of fourteen object columns, which are the objects of operation are displayed as the icons, and nine icons which correspond to the object columns 311 to 319 displayed in the object display region 352 are displayed as black squares so that they are differentiated from other icons.

The object columns 310 are arranged in a matrix in the x-y coordinate plane on the object display region 352, and the respective objects 300 which form the object columns 310 are aligned and displayed along the z axis with units of object columns 310. Coordinate information, including x, y and z coordinates, and region information for indicating display regions (display size of objects) occupied by the objects 300 are set for the objects 300, which are displayed on the basis of the coordinate information. Here, the x coordinate and the y coordinate correspond to the left-right directions and the up-down directions, respectively, on the display screen, and the z axis corresponds to the depth directions on the display screen. In the following, a coordinate system where the lower left end and the frontmost surface side in the object display region 352 becomes the origin is assumed for the description.

A plurality of objects 300 which form object columns 310 are displayed in such a manner that the respective objects 300 are shifted in position along the x axis and/or y axis depending on the z axis of the objects 300 so as to be overlapped, and the closer to the front surface side an object 300 is on the display screen, the greater and the brighter it is displayed. In the example shown in FIG. 10, for example, the objects 300 are shifted in position along the y axis depending on the z axis of the objects 300, and the degree that the objects 300 are shifted along the x coordinate is changed depending on the object column 310 located on the left column, the center column or the right column in the object display region 352. Concretely, in the object columns 311, 314 and 317 on the left column, the closer to the front surface side an object 300 is on the display screen, the smaller the values of the object 300 in the x coordinate and the y coordinate become, in the object columns 312, 315 and 318 in the center, the closer to the front an object 300 is on the display screen, the smaller the value of the object in the y coordinate become, and in the object columns 313, 316 and 319 on the right column, the closer to the front an object 300 is on the display screen, the greater the value of the object in the x coordinate becomes and the smaller the value of the object in the y coordinate becomes in the display.

In the information display terminal 100, the operational state can be detected via the contact sensors 112 and 122 in a predetermined detection period using the touch panel 110 and the touch pad 120. When the user touches the touch panel 110 with a finger or the like, and then removes the finger from the touch panel 110 without moving the finger on the touch panel 110, first location information is acquired (hereinafter this operation is referred to as point operation). Meanwhile, when the user moves a finger over the touch panel 110 in a state where the user keeps the finger on the touch panel 110, the movement of the contact point is detected via the contact sensor 112 so that the first location information can be acquired sequentially in accordance with the movement of the contact point (hereinafter this operation is referred to as dragging operation). In addition, a pointer 320 is displayed on the display screen on the display screen corresponding to the first location information. In the case where the user carries out a point operation or a dragging operation on the touch pad 120, second location information is acquired in the same manner.

When there are many object columns 310, which are objects of operation, all the object columns 310 cannot be displayed in the object display region 352. Therefore, the layout of the object columns 310 displayed in the object display region 352 together with the layout of all the object columns 310 are displayed as the icons in the layout display region 354 so as to be differentiated from the other objects. Here, the object columns 310 displayed in the object display region 352 are switched by designating an icon which corresponds to a specific object column 310 in the layout display region 354 or by operating a scroll bar, not shown.

In the following, the operations on the object columns 310 and objects 300 are described. In the information display terminal 100, a sliding operation and a moving operation are carried out on object columns 310 and a focusing operation is carried out on objects 300.

(Sliding Operation on Object Columns)

FIGS. 11A to 11D, 12A, 12B, 13A and 13B are diagrams illustrating the sliding operation on object columns 310, and FIGS. 14 to 17 are diagrams illustrating the display on the touch panel 110 which relates to the sliding operation.

FIGS. 11A to 11D, 12A, 12B, 13A and 13B schematically show the operation state of the touch panel 110 and the touch pad 120 and a display state of the object columns 310 (this is the same for FIGS. 18A, 18B and 19A to 19D which will be described below). Here, in FIGS. 11A to 11D, 12A, 12B, 13A and 13B, the left-right directions in the figures correspond to the z axis (depth direction on the display screen, the touch panel 110 is shown on the left and the touch pad 120 is shown on the right), and the up-down directions in the figures correspond to the y axis (up-down directions in the figures) (this is the same for FIGS. 18A, 18B and 19A to 19D which will be described below). In addition, a case where a sliding operation is carried out on the object columns 310 along they axis is shown. Cases where a sliding operation is carried out along the x axis (left-right directions in the figures) and along the x and y axes (left-right and up-down directions in the figures) are described in the same manner.

FIG. 11A shows four objects 300 which form an object column 310 in accordance with the z coordinates of the respective objects 300. That is to say, the respective objects 300 are shown so as to be overlapped with the y coordinates being shifted, and the closer to the front surface side an object 300 is on the display screen, the greater and the brighter the object 300 is displayed. FIG. 11A shows a state where the respective objects 300 are shown in the initial locations (hereinafter also referred to as initial display state).

When the user carries out a point operation 360 on the touch panel 110 in the state shown in FIG. 11A, first location information is acquired. The first location information is compared with the coordinate information and the region information of the objects 300 which form the object column 310 displayed in the object display region 352. In the case where the first location information corresponds to the coordinates within the display region (display region in the object display region 352 which is occupied by the objects 300 which form the object columns 310) of an object column 310 which is required from the coordinate information and the region information on the respective objects 300, the corresponding object column 310 is specified. In addition, when the user carries out a point operation 362 on the touch pad 120 in such a state that an object column 310 is specified, a sliding operation for the object column 310 is started.

Figure 11D:
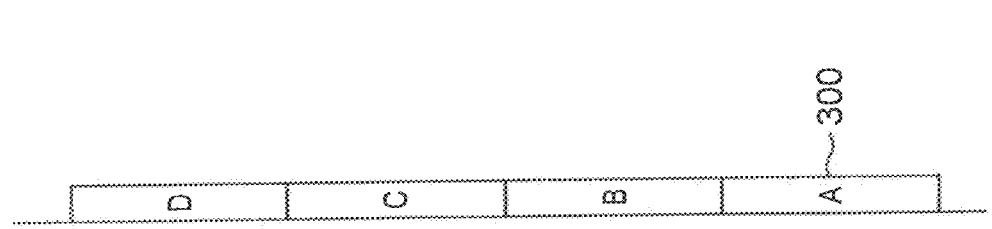
FIG. 11D is a diagram illustrating a sliding operation (state of initial display→state of list display) on an object column.
Figure 11C:
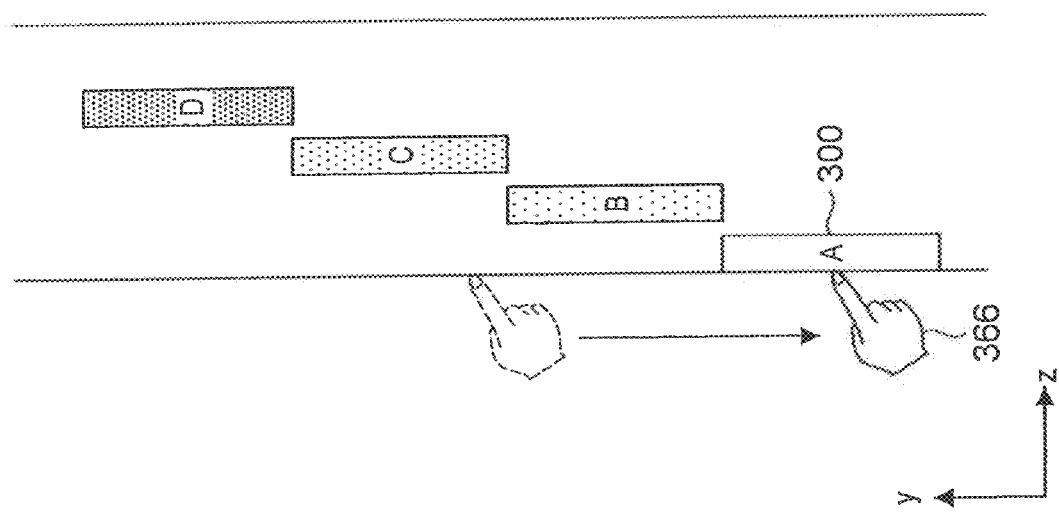
FIG. 11C is a diagram illustrating a sliding operation (state of initial display→state of list display) on an object column.

When the user carries out a dragging operation 364 or 366 on an object A300 over the touch panel 110 in the state where the sliding operation is started, as shown in FIGS. 11B and 11C, objects A to D300 are slid in the display (hereinafter also referred to as slide display state). Here, the user moves a finger in such a state that the finger keeps touching the display region of the object A300, and thus, carries out a dragging operation 364 or 366 on the object A300. When a dragging operation 364 or 366 is carried out on the object A300, the objects A to D300 are slid at equal intervals downwards along the y axis in such a manner that the amount of overlap with each other is reduced corresponding to the amount of the dragging operation (the distance of movement of the finger over the touch panel 110). The respective objects A to D300 slide along the y axis so that the amount of overlap with each other is reduced, and the more the amount of overlap is reduced, the closer to the front surface side it may move along the z axis on the display screen. In this case, the closer to the front surface side each object 300 is on the display screen, the greater and the brighter it is displayed.

As a result, a plurality of objects 300 move in response to the continuous change in the first location information with the amount of overlap between the objects 300 changing. Therefore, the plurality of objects 300 which form the object column 300 can be confirmed by displaying the objects 300 with the amount of overlap changing. In addition, the plurality of objects 300 are displayed greater as they move towards the front surface side, and therefore, the objects columns 310 can be operated without lowering the visibility.

Here, FIG. 11B shows a case where objects A to D300 are moved in such a manner that the amount of overlap with each other is reduced. However, the objects A to D300 can be moved upwards along the y axis in such a manner that the amount of overlap with each other increases from the state shown in FIG. 11B. In this case, each object 300 may be moved along the z axis so as to be placed towards the rear surface side on the display screen as the amount of overlap increases, and accordingly, the object may be displayed smaller and darker as it is located further towards the rear surface side.

When the amount of overlap between the objects A to D300 becomes 0 in the state where the sliding operation continues, as shown in FIG. 11C, the sliding operation of the object column 310 is completed, and as shown in FIG. 11D, the object column 310 is displayed in a list display state. In the list display state, the objects A to D300 move to the frontmost surface side on the display screen so that z=0, and thus, are displayed so as to not overlap with each other. In addition, the objects A to D300 are displayed with the same size and brightness.

As a result, the plurality of objects 300 move to the frontmost surface side and are displayed in the list with the same size, and therefore, an operation can be carried out on the objects 300 without lowering the visibility.

Figure 14:
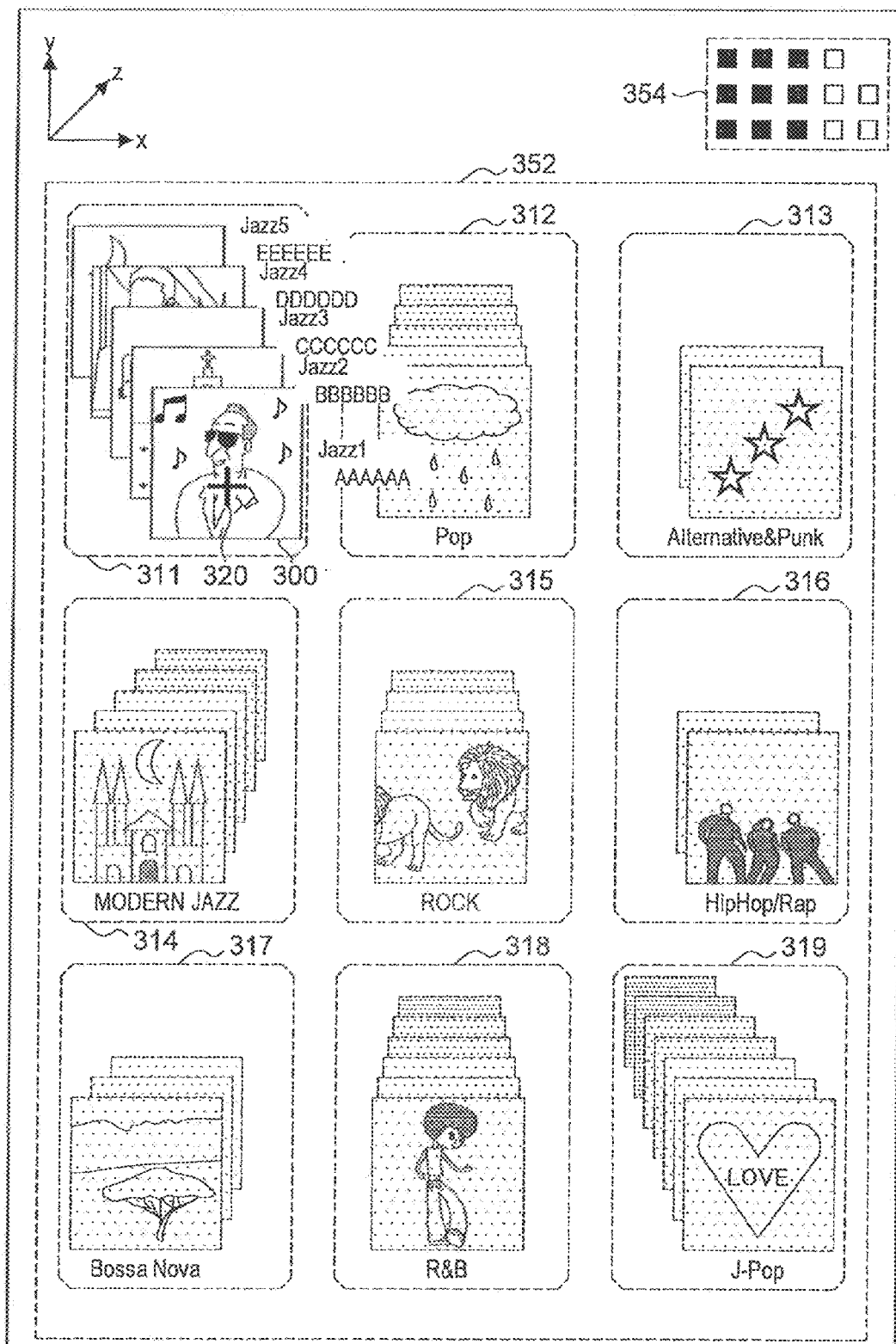
FIG. 14 is a diagram showing a display (state of slide display) relating to a sliding operation.
Figure 15:
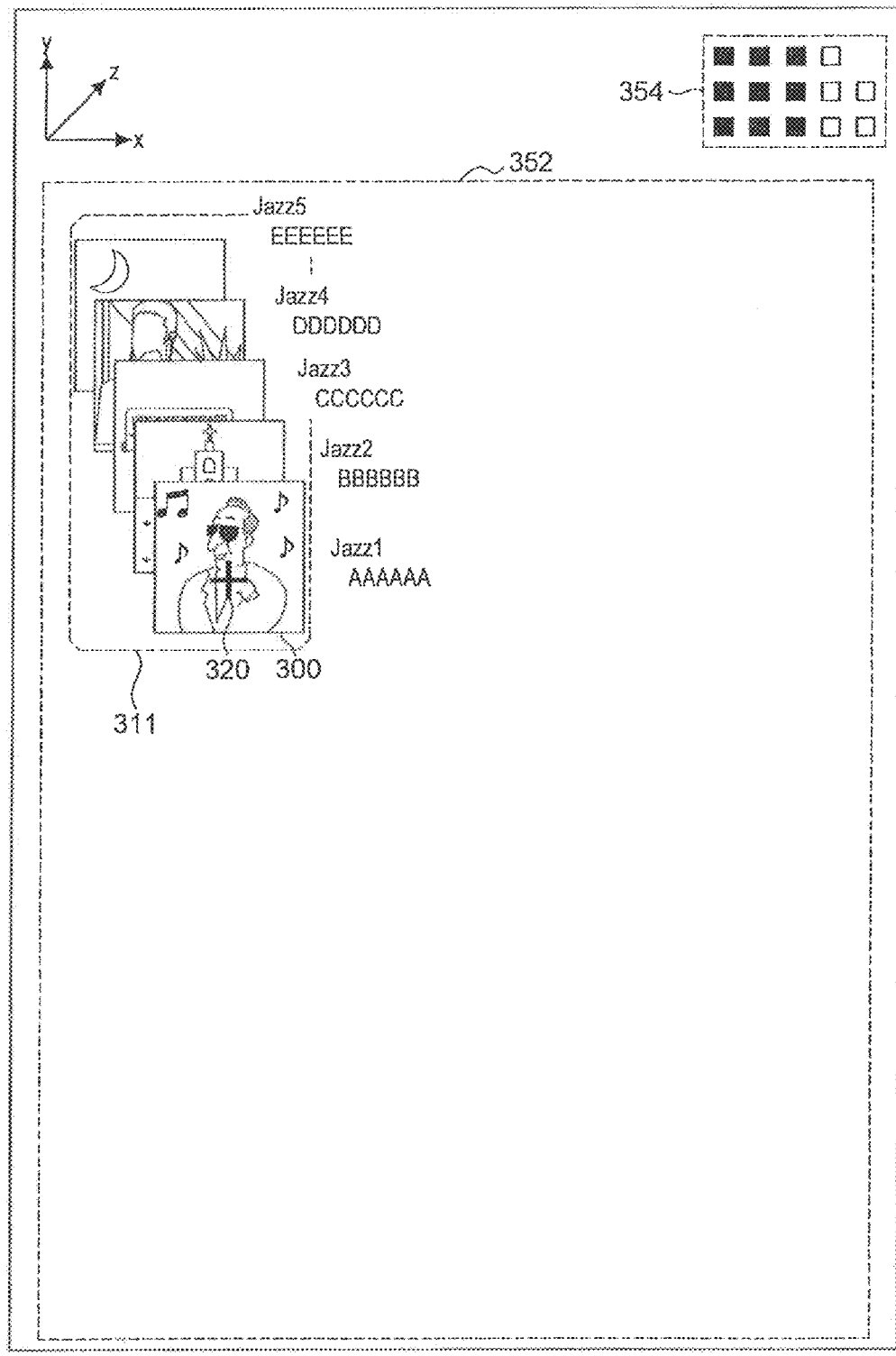
FIG. 15 is a diagram showing a display (state of slide display) relating to a sliding operation.

FIGS. 14 and 15 respectively show the display on the touch panel 110 in a state where a sliding operation starts and in a state where the sliding operation continues. In FIGS. 14 and 15, the object column 311 ("Jazz") is specified as the object column 310, which becomes the object of the sliding operation.

As shown in FIG. 14, when the sliding operation is started, the sliding operation is carried out on a specific object column 311 which is an object of the sliding operation in a state where the object columns 312 to 319, excluding the specific object column 311, are displayed darkly in the object display region 352. The specific object column 311 is slid along the y axis and displayed so that the amount of overlap of the plurality of objects 311 which form the object column 311 with each other is reduced in response to the amount of the dragging operation. In addition, affiliated information of each object 300 (album titles and artists of musical albums in the present example) is displayed to the side of the plurality of objects 300 and is slid and displayed together with the plurality of objects 300.

As shown in FIG. 15, when the sliding operation is continued and the amount of the dragging operation on the frontmost object 300 reaches to a predetermined value, object columns 312 to 319, excluding the specific object column 311 which is the object of the sliding operation, are not displayed in the object display region 352.

In the list display state, the user can select a specific object 300 within a predetermined period. As shown in FIG. 12A, when the user carries out a point operation on the object A300 on the touch panel 110, the contents 302 of the selected object A300 instead of the objects A to D300 are displayed in the object display region 352 as shown in FIG. 12B (hereinafter also referred to as content display state).

As a result, an object 300 is specified in a state where a plurality of objects 300 are displayed in a list and the contents 302 of the specified object 300 are displayed, and therefore, an operation on the object 300 can be carried out without lowering the visibility and the operability.

In the case where no dragging operation is carried out on the object column 310 within a predetermined period in the slide display state shown in FIG. 13A (corresponding to FIG. 11B), the display of the object column 310 changes from the slide display state to the initial display state. As shown in FIG. 13B, the display of the object column 310 changes from the slide display state to the initial display state, and the objects A to D300 are displayed so as to overlap with the y coordinates being shifted. Here, as for the change from the slide display state to the initial display state, a reverse operation, as in the case of the above described change from the initial display state to the slide display state, is carried out, except that the objects A to D300 slide without requiring the operations of the touch panel 110 and the touch pad 120.

As a result, the plurality of objects 300 which form the object column 310 move to the initial locations so as to be overlapped and arranged unless the location information is not acquired in the state where the plurality of objects 300 are displayed in the sliding locations, and therefore, the visibility can be prevented from lowering due to a blocking of the objects 300.

Figure 16:
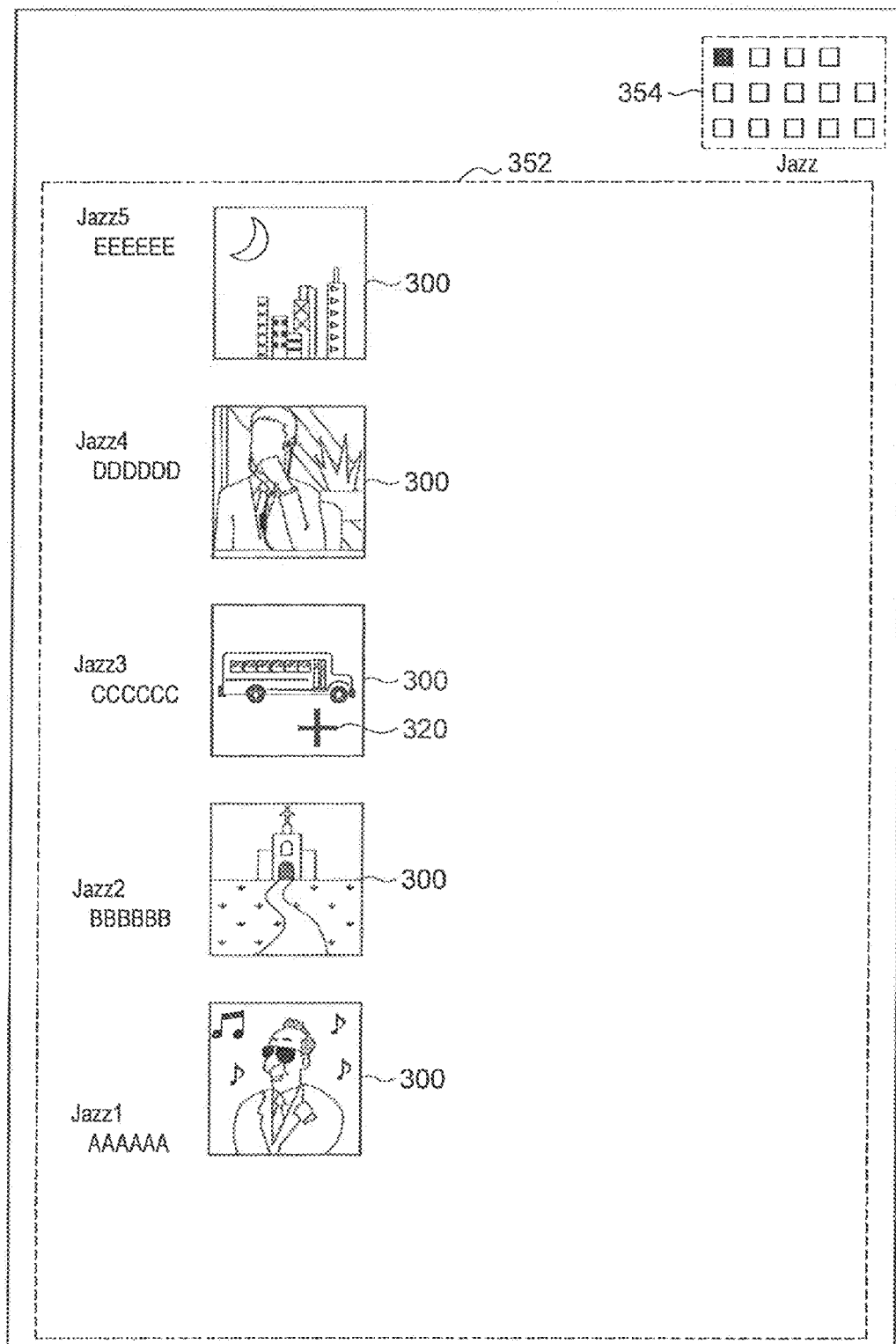
FIG. 16 is a diagram showing a display (state of list display) relating to a sliding operation.
Figure 17:
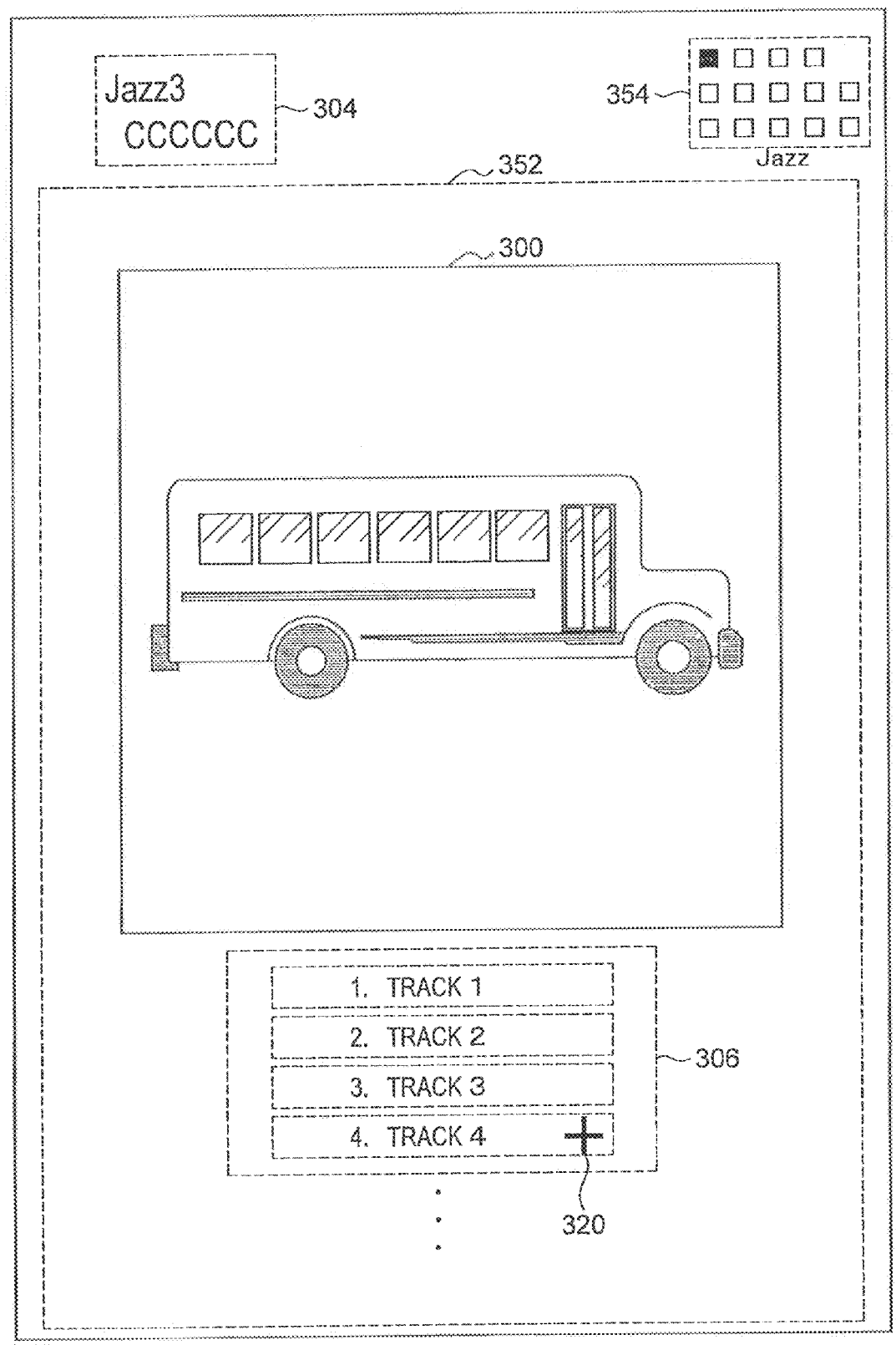
FIG. 17 is a diagram showing a display (state of contents display) relating to a sliding operation.

FIGS. 16 and 17 show the display on the touch panel 110 in the list display state and the content display state, respectively.

As shown in FIG. 16, in the list display state, a plurality of objects 300 are placed to the frontmost surface side on the display screen and displayed so as to not overlap with each other in the object display region 352. In the layout display region 354, the icon corresponding to the object column 311 displayed in the list display state is shown as a black square so as to be differentiated from the icons corresponding to other object columns.

As shown in FIG. 17, in the content display state, the selected object 300 and the affiliated information 304 (album titles and artists of musical albums in the present example) are displayed and enlarged in the object display region 352. In addition, a sub-object 306 (musical tracks included in musical albums in the present example) included in the selected object 300 is displayed in the lower portion of the object display region 352.

In the content display state, the user can select a sub-object 306 (musical track in the present example) included in the selected object 300 through the operation of the touch panel 110. In addition, a predetermined operation (for example, playing a musical track) can be carried out on the selected sub-object 306.

(Moving Operation on Object Column)

FIGS. 18A and 18B are diagrams illustrating the moving operation on the object column 310.

FIG. 18A shows four objects 300 which form the object column 310 in the same manner as in the case of FIG. 11A, and thus, the object column 310 is specified through the point operation 370 on the object column 310, but no point operation 362 is carried out on the touch pad 120.

When the user carries out a dragging operation 372 on the object A300 over the touch panel 110 as shown in FIG. 18B in the state where the object column 310 is specified, the object column 310 is moved and displayed. When the dragging operation 372 is carried out on the object A300, the objects A to D300 are moved on the y axis and displayed in such a state that they overlap with each other in response to the amount of the dragging operation.

Here, FIG. 18B shows a case where the objects A to D300 are moved on the y axis, and the cases where the objects are moved on the x axis or on the x and y axes can also be described in the same manner.

As a result, a plurality of objects 300 are moved and displayed in accordance with the state where the location information is acquired and the state of display of the object column 310 in response to the continuous change in the first location information, and therefore, a moving operation can be carried out on the object column 310.

(Focusing Operation on Objects)

FIGS. 19A to 19D are diagrams illustrating the focusing operation on the objects 300.

FIG. 19A shows four objects 300 which form the object column 310 in the same manner as in the case of FIG. 11A. In the state shown in FIG. 19A, the object A300 located to the frontmost surface side on the display screen is brought into focus, and the object A300 is displayed brightly. In the state shown in FIG. 19A, a point operation 374 is carried out on the touch panel 110 after the object column 310 has been specified through the point operation 360 on the object column 310 in the same manner as in the case shown in FIG. 11A. In this case, the point operation 374 is carried out on the area other than the display region of the object column 310.

When a point operation 374 is carried out on the touch panel 110, as shown in FIG. 19B, the focus on the objects 300 moves to the rear surface side on the display screen. Thus, the object B300 located on the rear surface side of the object A300 is focused so that the object B300 is displayed brightly, and the object A300 located on the front surface side of the object B300 is displayed translucently (shown by broken lines in FIGS. 19A to 19D).

In the same manner, when a point operation 376 is carried out on the touch pad 120 as shown in FIG. 19C, the focus on the objects 300 moves to the front surface side on the display screen as shown in FIG. 19D. Thus, the object A300 located on the front surface side of the object B300 is brought into focus so that the object A300 is displayed brightly.

As a result, when the first or second movement information is acquired in the state where a plurality of objects 300 are displayed in the initial locations, the focus on the objects 300 that form the object column 310 moves either to the front surface side or to the rear surface side in accordance with the movement information, and therefore, the focusing operation on the objects 300 can be intuitively carried out.

(Flow of Operation)

Figure 21:
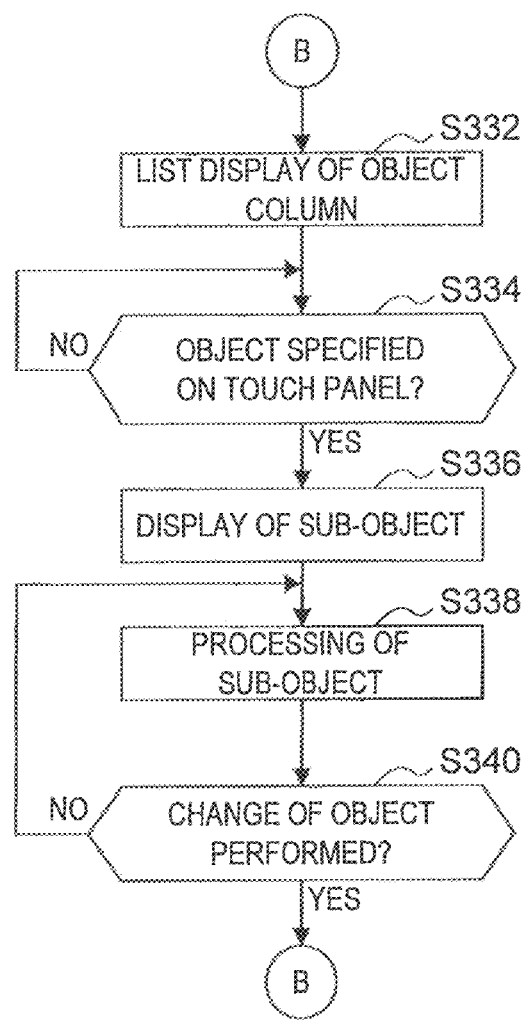
FIG. 21 is a flow chart showing the flow of the operation on an object column in the state of list display.

In the following, the flow of the operation on the object column 310 and the objects 300 is described in reference to FIGS. 20 and 21. FIG. 20 is a flow diagram showing the flow of the operation and the like in the case where the object column 310 is changed from the initial display state to the list display state. FIGS. 11A to 11D are flow diagrams showing the flow of the operation on the object column 310 in the list display state.

The information display terminal 100 determines whether or not the object column 310 is specified by carrying out the point operation (operation 360 shown in FIG. 11A, operation 370 shown in FIG. 18A) on the object column 310 in the initial display state on the touch panel 110 (S302). The information display terminal 100 carries out the subsequent process S304 in the case where the object column 310 is specified and returns to the process S302 in the case where the object column is not specified.

In such a state that the object column 310 is specified, the information display terminal 100 determines whether or not a point operation (operation 362 shown in FIG. 11A) has been carried out on the touch pad 120 (S304). The information display terminal 100 carries out the subsequent process S306 in the case where a point operation has been carried out and shifts to the process S322 for the moving operation and focusing operation which will be described below in the case where no point operation has been carried out.

In the case where a point operation has been carried out, the information display terminal 100 determines whether or not a dragging operation (operations 364 and 366 shown in FIGS. 11B and 11C) has been carried out on the specified object column 310 over the touch panel 110 within a predetermined period of time (for example, within one second after a point operation has been carried out) (S306). The information display terminal 100 carries out a subsequent process S308 in the case where a dragging operation has been carried out and moves to a process S324 for a focusing operation in the case where no dragging operation has been carried out. In the case where a dragging operation has been carried out, the information display terminal 100 converts the object column 310 to a slide display state (S308) for the slide display (S310).

When the object column 310 is converted to the slide display state, the information display terminal 100 determines whether or not the plurality of objects 300 which form the object column 310 are displayed so as to at least partially overlap (S312). Thus, the information display terminal 100 carries out a subsequent process S314 in the case where the objects are displayed so as to overlap and converts the object column 310 to a list display state in the case where they are displayed so as to not overlap (S320).

In the case where the objects are displayed so as to overlap, the information display terminal 100 determines whether or not a dragging operation (operations 364 and 366 shown in FIGS. 11B and 11C) has been carried out continuously on the object column 310 within a predetermined period of time (for example, within ten seconds after the dragging operation has been carried out) (S314). The information display terminal 100 returns to the process S310 in the case where a dragging operation has been carried out, and converts the object column 310 to the initial display state in the case where no dragging operation has been carried out (S316). Thus, the information display terminal 100 moves the plurality of objects 300 which form the object column 310 to the initial locations, carries out the initial display in a state where the objects overlap (S318), and returns to the process S302.

When the object column 310 is converted to the list display state in the process S320, the information display terminal 100 displays the object column 310 in a list (S332).

When the object column 310 is displayed in a list, the information display terminal 100 determines whether or not an object 300 is specified by carrying out a point operation (operation 368 shown in FIG. 12A) on the objects 300 over the touch panel 110 (S334). In the case where the object 300 has been specified, the sub-object 306 is displayed (S336) and a process is carried out on the sub-object 306 in accordance with the instructions from the user (S338).

After a process has been carried out on the sub-object 306, the information display terminal 100 determines whether or not a process for changing the objects 300 is to be directed (S340). The information display terminal 100 returns to the process S332 in the case where the change of the objects 300 has been directed and returns to the process S338 so that a process is carried out on the sub-object 306 in the case where no change has been directed.

In the case where no point operation (operation 362 shown in FIG. 11A) is carried out on the touch pad 120 in the process S304, the information display terminal 100 determines whether or not a point operation (operation 374 shown in FIG. 19A) has been carried out on the touch panel 110 for the region other than the display region of the object column 310 (S322). The information display terminal 100 carries out a subsequent process S324 in the case where a point operation has been carried out and shifts to the process S326 in the case where no point operation has been carried out. In addition, in the case where no dragging operation is carried out over the touch panel 110 within a predetermined period of time (for example, within one second after the point operation has been carried out) in the process S306, the information display terminal 100 carries out a process S324.

In addition, the information display terminal 100 moves the focus on the objects 300 to the front surface side or to the rear surface side on the display screen (S324) depending on whether the point operation (operations 374 and 376 shown in FIGS. 19A and 11C) has been carried out on the touch panel 110 or on the touch pad 120 and returns to the process S302.

In the case where no point operation is carried out on the touch panel 110 in the process S322, the information display terminal 100 determines whether or not a dragging operation (operation 372 shown in FIG. 18B) has been carried out on the specified object column 310 (S326). The information display terminal 100 moves and displays the object column 310 in the process S328 in the case where a dragging operation is carried out and returns to the process S302 in the case where no dragging operation is carried out.

As described above, the information display terminal 100 according to the second embodiment controls the display for operating the object column 310 and the objects 300 in accordance with the state where the first and/or the second location information is acquired and in accordance with the state of display of the object column 310, and therefore, can carry out a seamless operation on the object column 310 and on the objects 300.

In the above, a case is described where an operation in which the musical genres are the object columns 310, the musical albums are the objects 300, and the musical tracks are the sub-objects 306 is carried out on the information in three stages of musical genres→musical albums→musical tracks.

Here, an operation in which the musical genres and the artists are the object columns 310 can be carried out on, for example, the information in four stages of musical genres→musical artists→musical albums→musical tracks. In this case, a plurality of objects 300 which belong to the common musical genre are aligned for display in the object column 310 in a predetermined order, such as alphabetical order, for the artists of the musical albums. In addition, an operation in which the musical albums are the object columns 310 and the musical tracks are the objects 300 can be carried out, for example, on the information in two stages of musical albums→musical tracks. In addition, information in a number of stages which has been grouped in accordance with a predetermined standard, such as photographs, animated pictures and data, can be processed as the object.

Although the preferred embodiments of the present invention are described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

What is claimed is:

1. An information display method for displaying an object of a graphical user interface on a display screen, comprising:
projecting a three-dimensional coordinate space onto the display screen, the object arranged within the three-dimensional coordinate space as part of a group of related objects on the basis of three-dimensional coordinate information of the object;
acquiring first operation information from a touch panel having a contact detection surface overlaid on the display screen, the first operation information including first location information on the display screen corresponding to a contact location on the touch panel and including first contact pressure information, a size of a region of the contact detection surface of the touch panel through which input is received being adjusted based on a user stroke by detecting a start point and an end point of the user stroke and setting the region of the contact detection surface as a quadrilateral having a diagonal that connects the start point and the end point of the user stroke;
acquiring second operation information from a touch pad that includes a contact detection surface and that is provided on a surface opposite the display screen, the second operation information including second location information on the display screen and second contact pressure information;
controlling display of a first pointer corresponding to the first location information and a second pointer corresponding the second location information in the three-dimensional coordinate space on the display screen; and
controlling a display of the object in the three-dimensional coordinate space on the display screen on the basis of the acquired first operation information and second operation information,
wherein the group of related objects form an object column in which the objects are aligned in a direction of a first coordinate axis of the three-dimensional coordinate space to overlap,
the object column is specified on the basis of the first location information included in the first operation information or second location information included in the second operation information,
upon indication from the first operation information of a sliding operation on the contact detection surface overlaid on the display screen, the objects in the specified object column are caused to transition from alignment with the first coordinate axis of the three-dimensional coordinate space to a first state in which the objects in the specified column are aligned with a second coordinate axis of the three-dimensional coordinate space while the objects maintain a same relative position with respect to the first coordinate axis, and to transition from the first state to a second state in which the objects of the specified column maintain a same relative alignment with respect to the second coordinate axis while transitioning to a same position with respect to the first coordinate axis, the second coordinate axis being orthogonal to the first coordinate axis, and the objects in the specified object column are displayed without overlap after transitioning to the first state and in the second state, the sliding operation being performed after receipt of the second operation information, and
a layout display region is displayed in which a layout of a plurality of object columns is displayed using a plurality of icons, which correspond to objects in each of the plurality of object columns.

2. A computer-readable storage medium encoded with a program that, when executed, causes a computer to execute an information display method for displaying an object of a graphical user interface on a display screen, wherein the information display method comprises:
projecting a three-dimensional coordinate space onto the display screen, the object arranged within the three-dimensional coordinate space as part of a group of related objects on the basis of three-dimensional coordinate information of the object;

acquiring first operation information from a touch panel having a contact detection surface overlaid on the display screen, the first operation information including first location information on the display screen corresponding to a contact location on the touch panel and including first contact pressure information, a size of a region of the contact detection surface of the touch panel through which input is received being adjusted based on a user stroke by detecting a start point and an end point of the user stroke and setting the region of the contact detection surface as a quadrilateral having a diagonal that connects the start point and the end point of the user stroke;

acquiring second operation information from a touch pad that includes a contact detection surface and that is provided on a surface opposite the display screen, the second operation information including second location information on the display screen and second contact pressure information;

controlling display of a first pointer corresponding to the first location information and a second pointer corresponding the second location information in the three-dimensional coordinate space on the display screen; and controlling a display of the object in the three-dimensional coordinate space on the display screen on the basis of the acquired first operation information and second operation information, wherein the group of related objects form an object column in which the objects are aligned in a direction of a first coordinate axis of the three-dimensional coordinate space to overlap, the object column is specified on the basis of the first location information included in the first operation information or second location information included in the second operation information, upon indication from the first operation information of a sliding operation on the contact detection surface overlaid on the display screen, the objects in the specified object column are caused to transition from alignment with the first coordinate axis of the three-dimensional coordinate space to a first state in which the objects in the specified column are aligned with a second coordinate axis of the three-dimensional coordinate space while the objects maintain a same relative position with respect to the first coordinate axis, and to transition from the first state to a second state in which the objects of the specified column maintain a same relative alignment with respect to the second coordinate axis while transitioning to a same position with respect to the first coordinate axis, the second coordinate axis being orthogonal to the first coordinate axis, and the objects in the specified object column are displayed without overlap after transitioning to the first state and in the second state, the sliding operation being performed after receipt of the second operation information, and a layout display region is displayed in which a layout of a plurality of object columns is displayed using a plurality of icons, which correspond to objects in each of the plurality of object columns.

3. An information display terminal for displaying an object of a graphical user interface on a display screen, comprising:

circuitry configured to acquire first operation information from a touch panel having a contact detection surface overlaid on the display screen, the first operation information including first location information corresponding to a contact location on the touch panel and including first contact pressure information, wherein a three-dimensional coordinate space is projected onto the display screen, and the object is arranged within the three-dimensional coordinate space as part of a group of related objects on the basis of three-dimensional coordinate information of the object, the circuitry adjusting a size of a region of the contact detection surface of the touch panel through which input is received based on a user stroke by detecting a start point and an end point of the user stroke and setting the region of the contact detection surface as a quadrilateral having a diagonal that connects the start point and the end point of the user stroke, acquire second operation information from a touch pad that includes a contact detection surface and that is provided on a surface of the display terminal that is opposite the display screen, the second operation information including second location information on the display screen and second contact pressure information, control display of a first pointer corresponding to the first location information and a second pointer corresponding the second location information in the three-dimensional coordinate space on the display screen, and control a display of the object in the three-dimensional coordinate space on the display screen on the basis of the acquired first operation information and second operation information, wherein the group of related objects form an object column in which the objects are aligned in a direction of a first coordinate axis of the three-dimensional coordinate space to overlap, the circuitry specifies the object column on the basis of the first location information included in the first operation information or second location information included in the second operation information, upon indication from the first operation information of a sliding operation on the contact detection surface overlaid on the display screen, the circuitry causes objects in the specified object column to transition from alignment with the first coordinate axis of the three-dimensional coordinate space to a first state in which the objects in the specified column are aligned with a second coordinate axis of the three-dimensional coordinate space while the objects maintain a same relative position with respect to the first coordinate axis, and to transition from the first state to a second state in which the objects of the specified column maintain a same relative alignment with respect to the second coordinate axis while transitioning to a same position with respect to the first coordinate axis, the second coordinate axis being orthogonal to the first coordinate axis, and the objects in the specified object column are displayed without overlap after transitioning to the first state and in the second state, the sliding operation being performed after receipt of the second operation information, and the circuitry further controls display of a layout display region in which a layout of a plurality of object columns is displayed using a plurality of icons, which correspond to objects in each of the plurality of object columns.

4. The information display terminal according to claim 3, wherein the other of the first operation information and the second operation information includes second scroll information obtained in accordance with the corresponding first or second contact pressure information, and the circuitry controls the display so that the group of related objects included in the specified object column scroll in a direction on the first coordinate axis on the basis of the acquired second scroll information.

5. The information display terminal according to claim 3, wherein the circuitry controls the display so that the group of related objects scroll when the degree of the first or second contact exceeds a predetermined threshold value.

6. The information display terminal according to claim 3, wherein the first and second operation information respectively include first and second contact duration information, and the circuitry controls an acceleration of a display on which the group of related objects scroll on the basis of at least one of the first and second contact duration information.

7. The information display terminal according to claim 3, wherein the circuitry controls an acceleration of display on which the group of related objects scroll on the basis of a detection area of the contact on at least one of the touch panel and the touch pad.

8. The information display terminal according to claim 3, wherein the first operation information includes first start point information and first end point information as the first location information obtained from a moving state of a contact point detected on the contact detection surface provided on the display screen, the second operation information includes second start point information acquired at the same time as the first start point information and second end point information acquired at the same time as the first end point information as the second location information obtained from a moving state of a contact point detected on the contact detection surface provided on the surface on the side opposite to the display screen, and the circuitry specifies a frontmost object included in a specific object column on the display screen on the basis of the acquired first start point information, specifies a rearmost object included in the object column on the basis of the acquired second start point information, links the acquired first end point information to a location to which the frontmost object moves, and links the acquired second end point information to a location to which the rearmost object moves, and thus controls the display so that the plurality of objects included in the object column move in a plane perpendicular to the first coordinate axis.

9. The information display terminal according to claim 3, wherein the first operation information includes first start point information and first end point information as the first location information obtained from a moving state of a contact point detected on the contact detection surface provided on the display screen, the second operation information includes second start point information acquired at the same time as the first start point information and second end point information acquired at the same time as the first end point information as the second location information obtained from a moving state of a contact point detected on the contact detection surface provided on the surface on the side opposite to the display screen, and the circuitry calculates an amount of change in an angle between a reference axis obtained from the acquired first start point information and the second start point information and a movement axis obtained from the acquired first end point information and the second end point information, and changes an angle of an axis connecting a viewpoint indicating a frontmost apex of a pyramid which is a visual hull onto which the three-dimensional coordinate space is projected, and a reference point indicating a center of a projection surface, and thus, controls the display of the object on the display screen which is the projection surface in such a state that the angle of the axis is changed relative to the three-dimensional coordinate space.

10. The information display terminal according to claim 3, wherein the object is provided in a two-dimensional coordinate plane on the basis of two-dimensional coordinate information specific to the object, the first operation information includes first start point information and first end point information as the first location information obtained from a moving state of a contact point detected on the contact detection surface provided on the display screen, the second operation information includes second start point information acquired at the same time as the first start point information and second end point information acquired at the same time as the first end point information as the second location information obtained from a moving state of a contact point detected on the contact detection surface provided on the surface on the side opposite to the display screen, and the circuitry specifies a frontmost object included in a specific object column on the display screen on the basis of the acquired first start point information, specifies a rearmost object included in the object column on the basis of the acquired second start point information, links the acquired first end point information to a location to which the frontmost object moves, and links the acquired second end point information to a location to which the rearmost object moves, and thus controls the display so that the group of related objects included in the object column move to change a degree of overlap between the objects.

11. The information display terminal according to claim 3, wherein a second operation region which is an object of an operation on the contact detection surface provided on the surface on the side opposite to the display screen is smaller than a first operation region which is an object of an operation on the contact detection surface provided on the display screen, and the circuitry makes such an adjustment that the second location information on the display screen obtained from the second operation region corresponds to the first location information on the display screen obtained in the first operation region.

12. The information display terminal according to claim 11, wherein the circuitry is further configured to set operation region information for specifying a range of the second operation region on the basis of the second operation information acquired for each user.

13. The information display terminal according to claim 12, wherein the circuitry is further configured to store the operation region information set, and to read out the operation region information for a specific user in response to a request for a change to the specific user and sets the range of the second operation region.

14. The information display terminal according to claim 12, wherein the circuitry is further configured to store a number of operation region information instances in accordance with a direction in which the display screen is used, and to determine the direction in which the display screen is used, read out an operation region information instance in accordance with the direction in which the display screen is used, and set the range of the second operation region.

15. The information display terminal according to claim 14, wherein the circuitry determines the direction in which the display screen is used on the basis of the second operation information acquired from a user.

16. The information display terminal according to claim 14, wherein the circuitry is further configured to determine the direction in which the display screen is used on the basis of results of detection by an acceleration sensor.

17. The information display terminal according to claim 3, wherein the group of related objects form an object column, and the circuitry controls the display for operating the object column and the display for operating the objects which form the object column, in accordance with an acquisition state of the first location information included in the first operation information and/or the second location information included in the second operation information and a display state of the object column.

18. The information display terminal according to claim 17, wherein the circuitry controls the display of the object column so that an amount of an overlap between the objects changes and the group of related objects move in response to a continuous change in the first location information continuously acquired within a predetermined time after an acquisition of the second location information when the second location information is acquired in such a state that the group of related which form the object column are displayed in an initial location or in the slide location after the object column is specified by the first location information.

19. The information display terminal according to claim 18, wherein an object placed on a front surface side on the display screen from among the group of related objects which are placed in the object column to at least partially overlap is displayed larger than an object placed on a rear surface side, the circuitry controls the display of the object column so that the group of related objects move while changing the amount of the overlap between the objects in response to the continuous change in the first location information which is continuously acquired, and the smaller the amount of the overlap between the objects is, the further the objects move to the front surface side and the larger the objects are displayed, while the greater the amount of the overlap between the objects is, the further the objects move to the rear surface side and the smaller the objects are displayed.

20. The information display terminal according to claim 18, wherein an object placed on a front surface side on the display screen from among the group of related which are placed in the object column to at least partially overlap is displayed larger than an object placed on a rear surface side, and the circuitry controls the display of the object column so that the plurality of objects move to a frontmost surface side to be displayed in a list with the same size when the group of related objects forming the object column are arranged so as not to overlap for a display.

21. The information display terminal according to claim 20, wherein the circuitry controls the display of the object column so that the group of related objects are displayed larger as the objects move to the front surface side.

22. The information display terminal according to claim 20, wherein the circuitry controls the display of the objects so that contents of the objects are displayed when the objects are specified by the first location information in such a state that the group of related objects are displayed in a list.

23. The information display terminal according to claim 17, wherein the circuitry controls the display of the object column so that the group of related objects forming the object column move to the initial location and are aligned to overlap when the first and second location information are not acquired within a predetermined period in such a state that the group of related objects forming the object column are displayed in the slide location after the object column is specified by the first location information.

24. The information display terminal according to claim 17, wherein the circuitry controls the display of the object column so that the object column moves in response to a continuous change in the first location information which is continuously acquired in a state where the group of related objects forming the object column are displayed in the initial location after the object column is specified by the first location information.

25. The information display terminal according to claim 17, wherein the circuitry controls the display of the objects so that an object of focus that is one of the group of related objects forming the object column shifts to another object placed on any one of a front surface side or a rear surface side of an object on the display screen which is the object of focus when the first location information is acquired, and shifts to another object placed on the other of the front surface side or the rear surface side of the object on the display screen which is the object of focus when the second location information is acquired when the first location information or the second location information which does not specify the object column is acquired in such a state that the group of related objects forming the object column are displayed in the initial location after the object column is specified by the first location information.

26. The information display terminal according to claim 3, wherein in the layout display region, icons corresponding to the object column specified are displayed with a different visual characteristic from other icons in the layout display region in order to identify the object column specified as being displayed.

27. The information display terminal according to claim 26, wherein the icons corresponding to the object column specified are black, and the other icons are white.

* * * * *